INVENTOR.
R.W. VERGOBBI
E.L. DODD
BY
Robert R. Churchill
ATTORNEY

Dec. 28, 1965   R. W. VERGOBBI ETAL   3,225,847
WEIGHING MACHINE
Filed Dec. 21, 1962   14 Sheets-Sheet 4

INVENTOR.
R.W. VERGOBBI
E.L. DODD
BY
Roberts Churchill
ATTORNEY

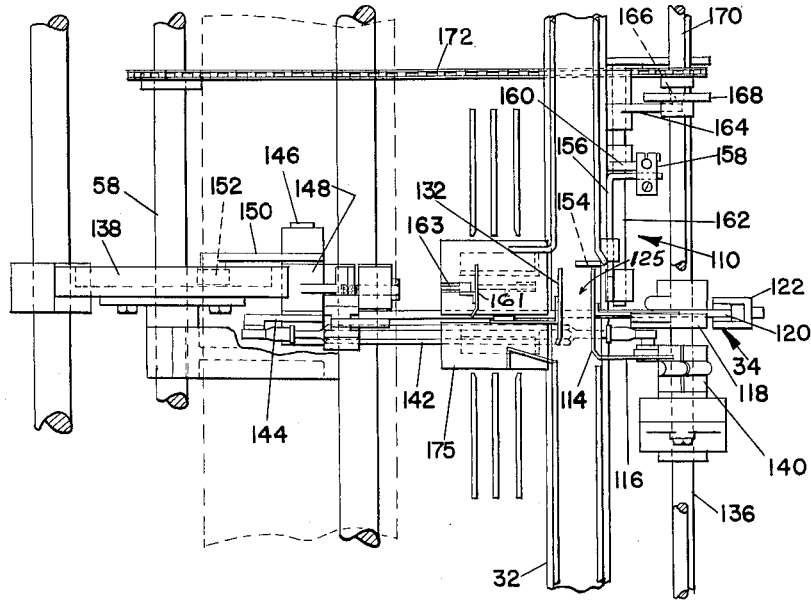
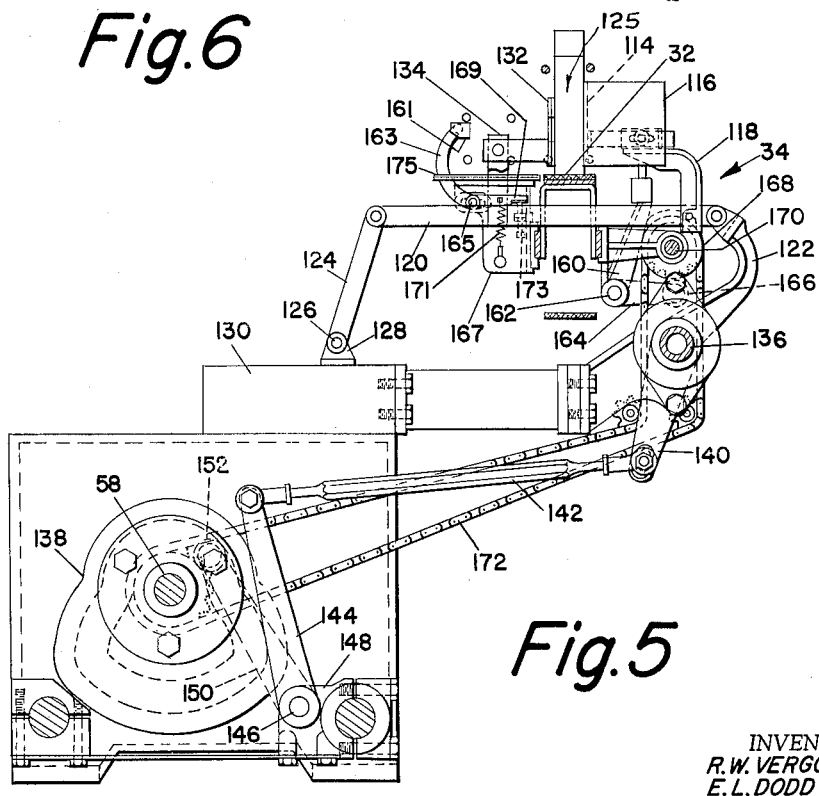

INVENTOR.
R.W. VERGOBBI
E.L. DODD

BY

Robert. Churchill

ATTORNEY

Dec. 28, 1965  R. W. VERGOBBI ETAL  3,225,847
WEIGHING MACHINE
Filed Dec. 21, 1962  14 Sheets-Sheet 10

INVENTOR.
R.W. VERGOBBI
E.L. DODD
BY
Robert R. Churchill
ATTORNEY

Dec. 28, 1965  R. W. VERGOBBI ETAL  3,225,847
WEIGHING MACHINE
Filed Dec. 21, 1962  14 Sheets-Sheet 12

INVENTOR.
R. W. VERGOBBI
E. L. DODD
BY
Robert R. Churchill
ATTORNEY

United States Patent Office 3,225,847
Patented Dec. 28, 1965

3,225,847
WEIGHING MACHINE
Robert W. Vergobbi, Braintree, and Edmund L. Dodd, Quincy, Mass., assignors to Pneumatic Scale Corporation, Limited, Quincy, Mass., a corporation of Massachusetts
Filed Dec. 21, 1962, Ser. No. 246,382
21 Claims. (Cl. 177—52)

This invention relates to a weighing machine and more particularly to a multiple unit gross weight weighing machine.

The invention has for an object to provide a novel and improved weighing machine of the character specified having a plurality of multiple weighing units, each comprising at least one bulk weighing station and one drip weighing station arranged in a line and adapted to handle a plurality of containers simultaneously whereby to provide a gross weight weighing machine of greatly increased productive capacity.

The invention has for a further object to provide a novel and improved weighing machine of the character specified operating in successive cycles and embodying container handling mechanism arranged to receive the containers from a supply thereof in groups of a predetermined number corresponding to the number of multiple weighing units and to distribute the containers in the groups to their respective weighing units to be filled and weighed during successive cycles of operation and to thereafter reassemble such groups of containers and to discharge the same in the same order in which they were received.

A still further object of the invention is to provide a novel and improved multiple unit automatic weighing machine of the character specified embodying novel pneumatically operated control means which is of particular advantage for use in a packaging plant where the atmosphere may be charged with explosive dust from the product being packaged and which may comprise a hazard when electrical controls embodying arcing switch contacts are employed.

With these general objects in view and such others as may hereinafter appear, the invention consists in the weighing machine and in the various structures, arrangements and combinations of parts hereinafter described and particularly defined in the claims at the end of this specification.

In the drawings illustrating the preferred embodiment of the invention:

FIG. 5 is a cross sectional view of the container transfer mechanism as seen from the line 5—5 of FIG. 1;

FIG. 6 is a plan view of the same;

Figure 1:
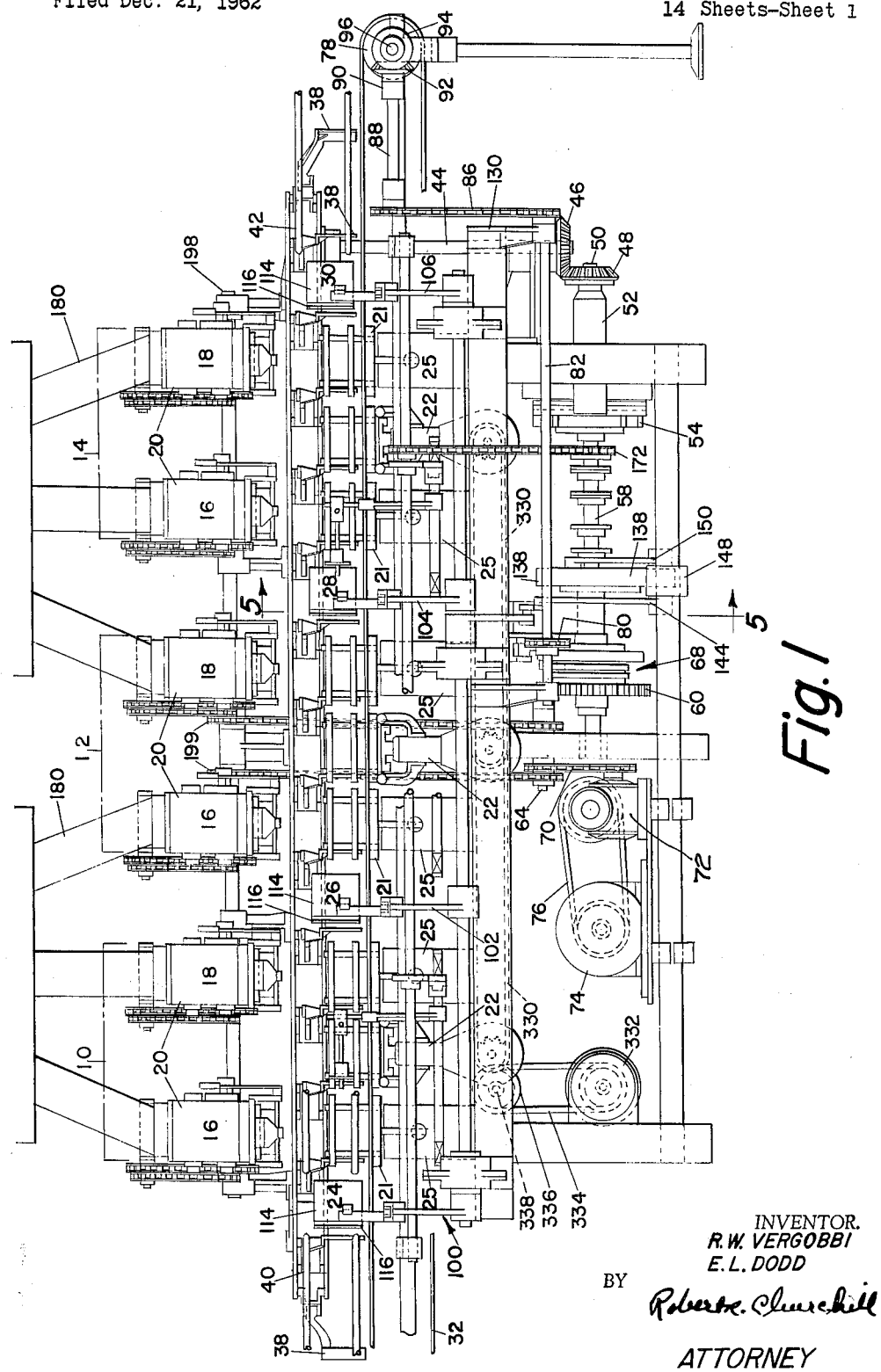
FIG. 1 is a front elevation of a multiple unit gross weight weighing machine embodying the present invention.

In general the present invention contemplates a novel and improved multiple unit gross weight weighing machine of the type wherein each unit may comprise a duplex unit provided with a bulk weighing station for depositing and weighing the major portion of the load into a container, and a drip or final weighing station for depositing a small additional amount of material into the container to bring the filled container up to a predetermined weight. Such automatic weighing machines are limited in their productive capacity for most efficient weighing performance because of the time required to feed the material into the container until a predetermined weight is reached and also the time required to move the container into and out of weighing position. As a result, efficient weighing performance will average about thirty packages a minute. On the other hand, other machines in a packaging line, such as a high speed container forming machine, may operate at a rate of about ninety containers a minute. Prior to the present invention it has been the practice to provide a plurality of individual duplex weighing machines in the packaging line, and the containers produced by the high speed container forming machine were diverted into a plurality of lines and conveyed by separate conveyers to the different weighing machines to maintain the productive capacity.

In the illustrated embodiment of the invention a plurality of duplex weighing units, each having a bulk and a drip weighing station, herein shown as three duplex weighing units, are provided in a single machine, the duplex weighing units being arranged in a straight line and operating at a cyclical rate of thirty packages a minute to take care of the output of a container forming machine operating at a cyclical rate of ninety containers a minute.

In the operation of the multiple unit weighing machine the containers are intermittently advanced one station of operation each cycle, and in accordance with a feature of the present invention novel container handling or shuttling mechanism is provided having provision for releasing and advancing a group of three containers to be received into the machine on a supply conveyer each cycle of operation and for distributing and transferring the individual containers of the group during successive cycles from the supply conveyer into operative position to be intermittently advanced to their respective duplex weighing units to be filled and weighed. Thereafter, the shuttling mechanism effects transfer of the filled containers from their respective duplex weighing units back onto the supply conveyer to be regrouped and discharged in the same order in which they are received. As a result, as succeeding groups of three containers are delivered into the multiple unit weighing machine each cycle of operation, all three duplex weighing units will be operating simultaneously to fill and weigh individual containers of successive groups whereby to provide a production capacity of ninety containers a minute corresponding to the production capacity of the container forming machine.

In a modified form of the invention each multiple weighing unit is provided with two bulk weighing stations and a single drip weighing station to accommodate the larger loads required in extra large cartons. In this embodiment two multiple weighing units are provided, each having three weighing stations, and the containers are released into the machine in groups of two containers each cycle to be distributed to the two multiple weighing units.

Other novel features of the invention to be hereinafter more fully described include the provision of pneumatically operated control means responsive to the individual weighing units for discontinuing the feed of the material to the weighing unit when a predetermined weight is reached and controls common to all of the weighing units for controlling the cyclical operation of the multiple unit weighing machine.

Figure 2:
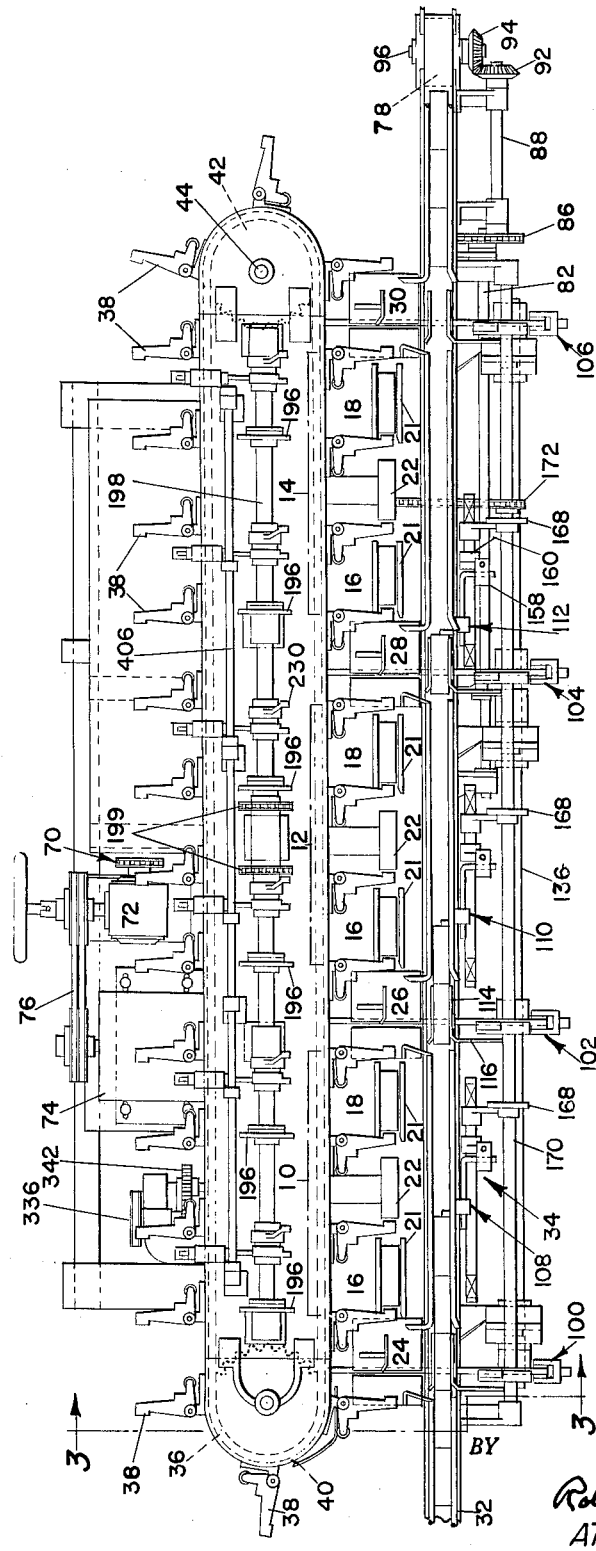
FIG. 2 is a plan view of the same with the material supply hopper removed.

Referring now to the drawings, and particularly to FIGS. 1 and 2, in general the present multiple unit automatic gross weight weighing machine includes a plurality of substantially duplicate weighing units, herein shown as six weighing units comprising three duplex units 10, 12 and 14, each having a bulk weighing station 16 and a drip weighing station 18 arranged in a straight line. Each weighing unit is provided with a material feeding hopper 20 having pneumatically operated controls common to all of the weighing units arranged to initiate the feeding operations simultaneously and which are arranged to discontinue their feeding operations independently in response to the individual weighing operations when the material deposited into the container reaches a predetermined weight. During the weighing operations the containers are supported on scale pans 21 forming a part of pneumatically operated weighing units indicated generally at 25 to be hereinafter more fully described. Intermediate each bulk and drip weighing station is provided a vibrator or shaker station 22 for settling the bulk load in the container before introducing the drip load. Also included in the weighing line are four container transfer stations indicated generally at 24, 26, 28, 30. Empty containers are transferred from a supply conveyer 32 into the weighing line at stations 24, 26 and 28, and the filled containers in the weighing line are withdrawn at stations 26, 28, 30 to be returned to the supply conveyer 32 and discharged from the machine. The containers are moved into and out of the transfer stations by container handling or shuttling mechanism indicated generally at 34 to be hereinafter more fully described.

Figure 3:
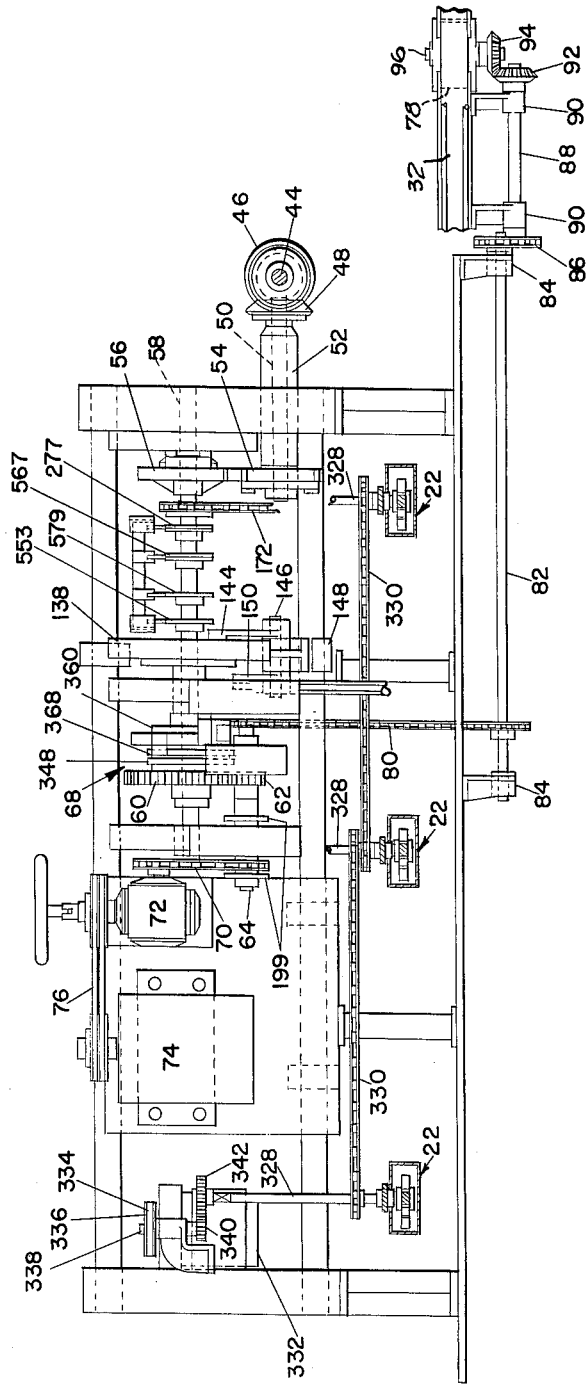
FIG. 3 is a plan view of the driving mechanism.
Figure 4:
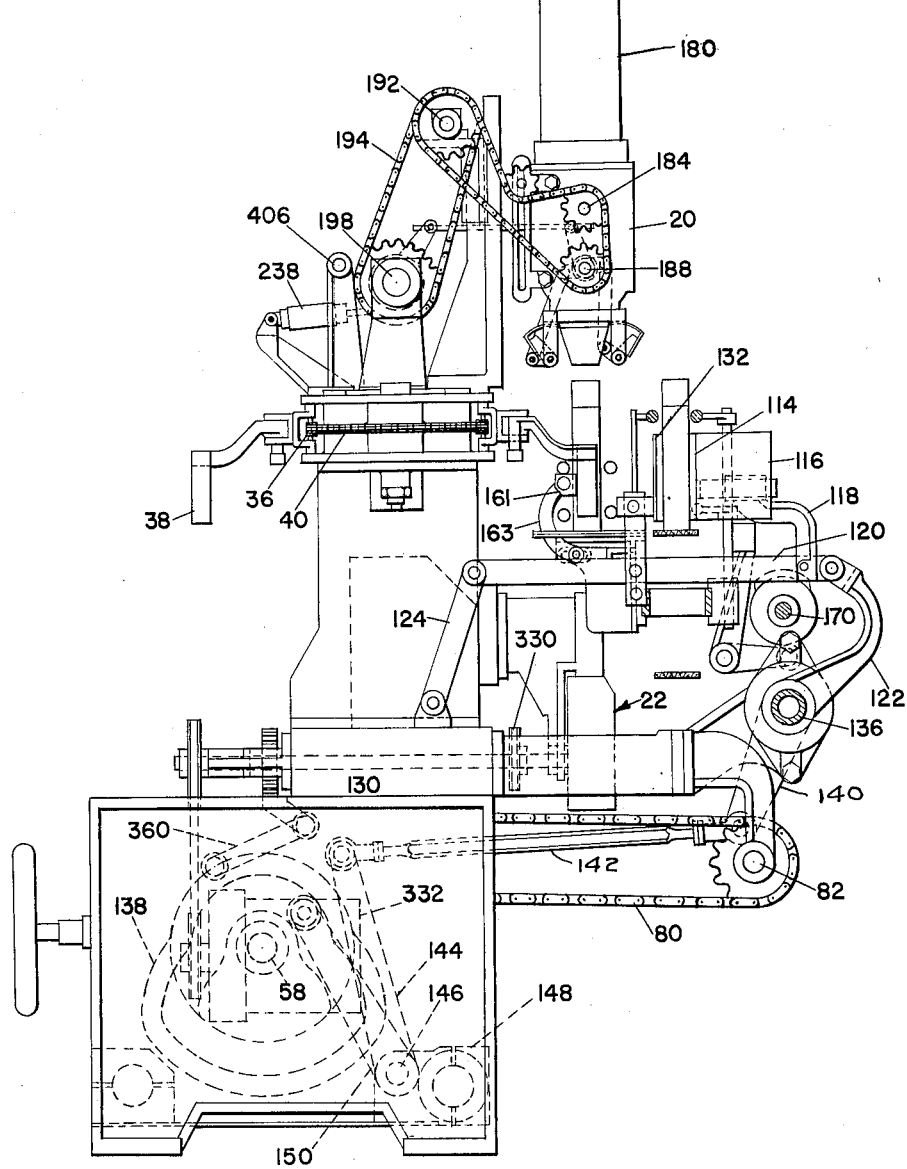
FIG. 4 is a side elevation of the machine as seen from the left hand side of FIG. 1.

The containers in the weighing line are intermittently advanced one station each cycle of operation by a chain conveyer 36 provided with spaced carrier fingers 38 as shown. The chain conveyer 36 is arranged to run over an idler sprocket 40 at one end of the machine and over a drive sprocket 42 at the other end. The drive sprocket 42 is fast on a vertical shaft 44 supported for rotation in the machine frame, the lower end of the shaft being connected by bevel gears 46, 48 to a horizontal shaft 50 which is journaled in a bearing 52 attached to the machine frame. As shown in FIG. 3, the other end of the shaft 50 carries the driven member 54 of a Geneva drive mechanism, the driving member 56 of which is fast on a main cam shaft 58. The main cam shaft is provided with a gear 60 in mesh with a drive pinion 62 carried by a short shaft 64 journaled in the machine frame. The gear 60 is loose on the cam shaft and is formed integrally with a ratchet forming a part of a one-revolution clutch indicated generally at 68 arranged to be normally in driving engagement when all of the weighing units complete their weighing operations within a predetermined time cycle as will be hereinafter more fully described. The short shaft 64 is driven by a sprocket and chain connection 70 to the output shaft of a speed reducer 72 which in turn is driven by an electric motor 74 connected by a belt and pulley drive 76 to the input shaft of the speed reducer. Thus, in operation the chain conveyer 36 is advanced with its carrier fingers 38 to move the containers one station along the weighing line each cycle of operation.

Figure 8:
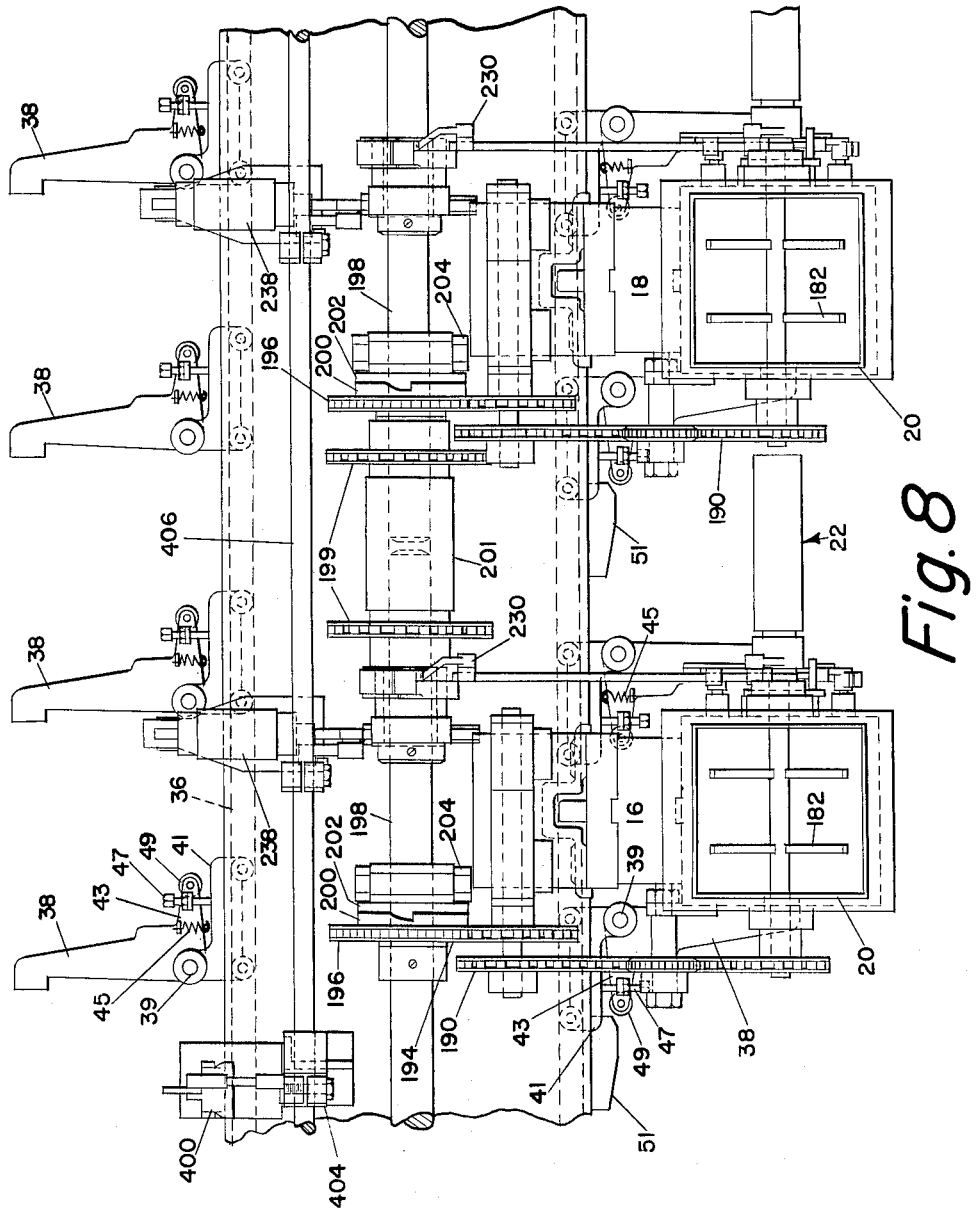
FIG. 8 is a plan view of a duplex weighing unit including a bulk weighing station and a drip weighing station and showing the material feed hoppers and associated control mechanism.

As shown in FIG. 8, each carrier finger 38 is pivotally mounted at 39 in a chain link bracket 41 and is provided with an arm 43 connected by a spring 45 to the bracket 41, the rocking movement of the finger being limited by an adjustable screw 47 engageable with the bracket. The arm 43 also carries a roller 49 which is arranged to cooperate with a stationary cam piece 51 to rock the finger forwardly when the finger approaches a weighing station so as to effect advancement of a container onto the scale pan 21 before the intermittently operated finger comes to rest. Immediately thereafter, the roller 49 leaves the cam piece 51, and the spring 45 rocks the finger away from the container so as to leave the latter free of contact with the finger the weighing operation.

The containers are delivered to the machine from a source of supply on the supply conveyer 32. The supply conveyer 32 is arranged to run over a drive pulley 78 at one end and is continuously driven through a chain and sprocket connection 80 between the short shaft 64 and a shaft 82 carried by brackets 84 attached to the machine frame as shown in FIGS. 1 and 3. The shaft 82 is connected by a second chain and sprocket drive 86 to a shaft 88 mounted for rotation in bearing brackets 90 attached to the conveyer side frame. The shaft 88 is provided with a bevel gear 92 which meshes with a bevel gear 94 carried by the pulley shaft 96.

The containers on the supply conveyer 32 are arranged in contiguous engagement and the shuttling mechanism 34 is arranged to release the containers from the supply in groups of three each cycle of operation and to distribute and transfer successive containers in each group to their respective duplex weighing units 10, 12 and 14. The container handling or shuttling mechanism 34 includes a plurality of transfer mechanisms, herein shown as four transfer mechanisms indicated generally at 100, 102, 104 and 106, for cooperation with the transfer stations 24, 26, 28 and 30, respectively in, the weighing line. The shuttling mechanism 34 further includes a plurality of container stopping and releasing mechanisms, herein shown as three stopping and releasing mechanisms indicated generally at 108, 110 and 112, and which are arranged to cooperate with the transfer mechanisms by holding the containers stationary on the continuously moving conveyer during the transferring operations and to permit passage of the containers along the conveyer when the transfer mechanisms are in their retracted position.

As herein shown, see FIGS. 5 and 6, each container transfer mechanism includes an L-shaped pusher plate 114 having a rearwardly extending leg 116 which serves as a stop for the supply of containers on the conveyer 32 when the pusher is in its forward position. The pusher plate 114 is carried by a bracket 118 mounted on a parallel bar 120 supported at one end by a rocker lever 122 and at its other end by a arm 124 pivotally mounted at 126 in a bracket 128 secured to the lower platen 130. Also mounted for movement with the parellel bar 120 is a rear plate 132 spaced from the pusher plate 114 a distance such as to provide clearance for a container to pass therebetween and forming, in effect, a pocket by which a container may be transferred to and withdrawn from the weighing line. The rear plate 132 is carried by a bracket 134 adjustably secured to the parallel bar as shown. The rocker lever 122 of each transfer mechanism is mounted fast on a rocker shaft 136 which is arranged to be rocked by a closed cam 138 fast on the cam shaft 58 through linkage including an arm 140 fast on the rocker shaft 136 connected by a link 142 to an arm 144 fast on one end of a short shaft 146 mounted to rock in a bracket 148 secured to the machine frame. The other end of the short shaft is provided with a cam lever 150 having a roll 152 cooperating with the closed cam 138.

As shown in FIG. 6, each stopping and releasing mechanism 108, 110, 112 includes a stop plate 154 mounted for longitudinal adjustment on one leg of an L-shaped rod 156, the other leg being mounted for adjustment in a block 158 carried by an arm 160 fast on an individual rocker shaft 162. Each rocker shaft 162 also carries a cam lever 164 provided with a roller 166 fo cooperation with its individual cam 168 carried by an elongated cam shaft 170. The cam shaft 170 is driven from the main cam shaft 58 by a chain and sprocket drive 172. Each cam 168 is mounted for rotary adjustment on the cam shaft 170 to effect stopping and releasing of the containers on the conveyer 32 in a predetermined timed sequence so as to effect distribution of the empty containers to their respective duplex weighing units 10, 12, 14 and to effect regrouping of the filled containers on the conveyer 32 to be discharged in the same order in which the group entered the machine.

Figure 7:
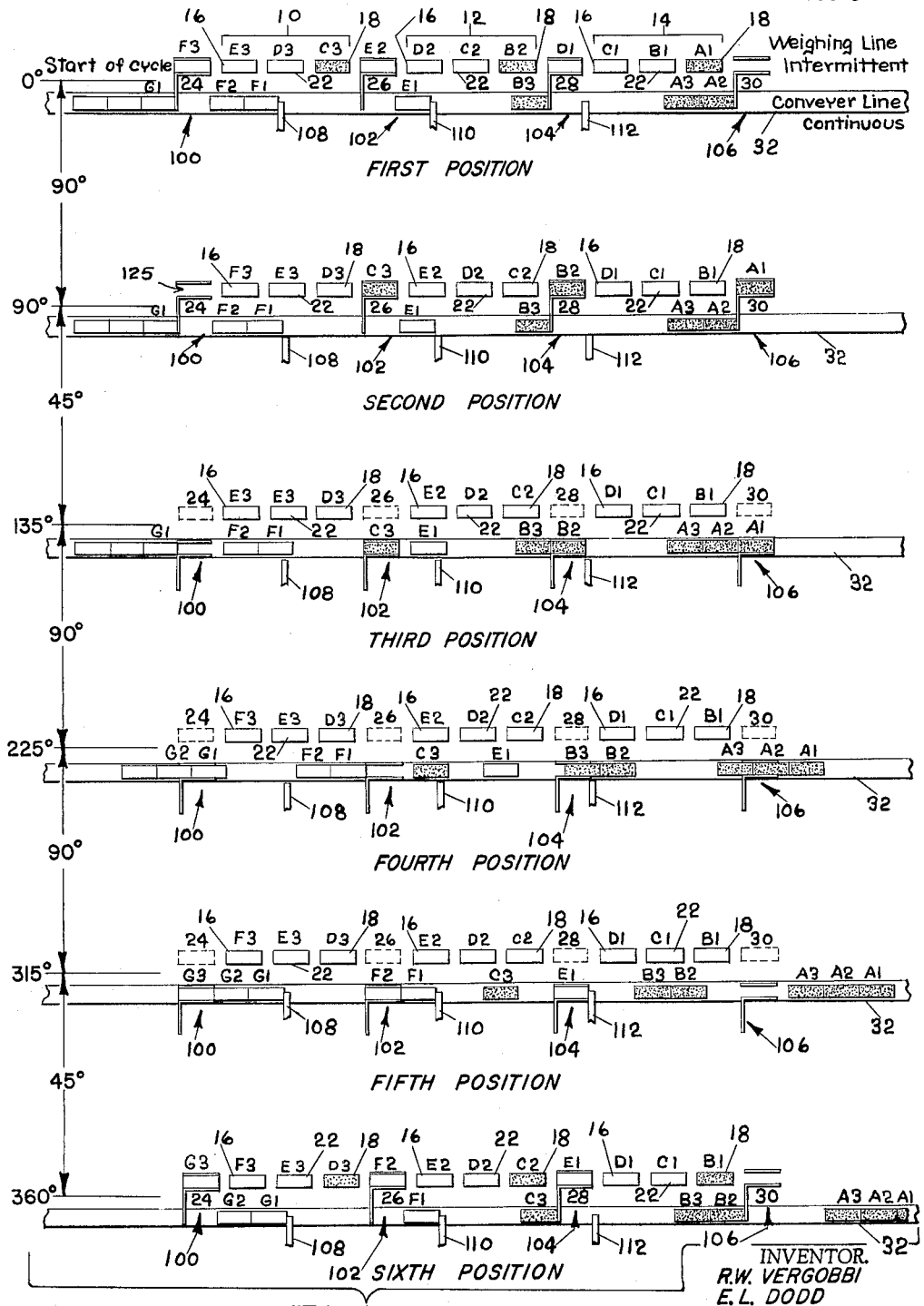
FIG. 7 is a diagrammatic view showing the sequence of movement of the individual containers during one cycle of operation of the machine.

FIG. 7 diagrammatically illustrates the sequence of distribution of the individual empty containers of successive groups thereof into the weighing line, and the corresponding sequence of withdrawal and regrouping of the filled containers on the conveyer 32. In operation a group of three empty containers is permitted to enter the machine from the supply each cycle of operation, at a time when the first transfer unit 100 is in its retracted position, the two foremost containers of the group of empty containers passing through the pocket 125 defined by the pusher plate 114 and the opposing rear plate 132 and coming to rest against the stop plate 154 of the first stop mechanism 108 with the endmost empty container of the group remaining in the pocket 125. Thereafter, the transfer unit 100 is operated to deliver the endmost empty container of the group to the transfer station 24 in the weighing line and in a position to be engaged by a carrier finger 38 of the chain conveyer 36. When the transfer unit 100 is in its forwardly moved position, the rearwardly extended leg 116 of the pusher plate 114 serves to hold back the line of containers in the supply.

The position of the containers of a group of three permitted to enter the machine, as above described, is diagrammatically indicated in FIG. 7 in the first position at the start of a cycle of operation, wherein the two foremost containers being held on the conveyor by the stop 108 are identified as containers F-1 and F-2, and the container transferred from the group to the transfer station 24 is identified as F-3. During the first 90° of the cycle the containers in the weighing line are intermittently moved one station of operation so as to move the container F-3 from the transfer station 24 to the bulk weighing station of the first duplex weighing unit 10 as shown in the second position in FIG. 7. At this time the stop member 108 is also retracted to permit the foremost containers F-1 and F-2 to be advanced on the continuously moving conveyer 32. As shown in the third position in FIG. 7, during the next 45° of the cycle the transfer unit 100 is retracted to permit a new group of three containers, identified as G-1, G-2, G-3, to enter the machine while the containers F-1 and F-2 continue to be advanced along the conveyer 32. In the fourth position, 90° beyond the third position, the containers F-1 and F-2 are just entering the pocket of the second transfer station 102, and during the next 90° of the cycle as shown in the fifth position, the second stop 110 is moved forward, and the leading container F-1 has come to rest against the stop 110 while the container F-2 is retained in the pocket of the transfer unit 102. Simultaneously therewith, the stop 108 has again been moved forward, and the group of three new containers G-1, G-2 and G-3 has come to rest against the same. During the last 45° of the cycle of operation the transfer units are operated to transfer the container F-2 from the conveyer 32 to the transfer station 26 immediately preceding the bulk weighing station of the second duplex weighing unit 12, as illustrated in the sixth position, which comprises the end of the cycle. Simultaneously therewith, the endmost container G-3 of the new group is transferred from the conveyer 32 to the transfer station 24 which corresponds to the same relative position of the containers at the start of a cycle shown in the first position. During a succeeding cycle of operation the remaining container F-1 is released by the stop 110 to pass along the conveyer 32 into the pocket of the transfer unit 104 and against the third stop 112 to be transferred to the transfer station 28 immediately preceding the bulk weighing station of the third duplex weighing unit 14. It will be observed that the stop members 108, 110, 112 are spaced from their respective transfer units 100, 102, 104: a distance of three containers at the first stop 108; a distance of two containers at the second stop 110; and a distance of one container at the third stop 112 as shown in FIG. 7.

From the description thus far it will be seen that when three new containers of a group are permitted to enter the machine during one cycle of operation, the endmost container of the group is transferred to station 24 during the same cycle while the remaining two containers of the group are advanced and transferred to their respective stations 26, 28 during the two succeeding cycles. It will also be seen that when the endmost container G-3 of the incoming group is transferred to station 24 to be filled and weighed at the first duplex weighing unit 10, containers of preceding groups are simultaneously transferred to their respective duplex weighing units. Thus, as illustrated in FIG. 7, when G-3 is transferred to the first unit 10, F-2 and E-1 are simultaneously transferred to the second and third units 12, 14 respectively. Thus, three empty containers of different groups are transferred to their respective duplex weighing units each cycle of operation. It will be evident that all of the containers being handled by the first duplex weighing unit 10 are identified by the numeral 3; all of the containers handled by the second unit 12 are identified by the numeral 2; and all of the containers handled by the third unit 14 are identified by the numeral 1, preceded by the letter identifying its group.

It will be understood that at the start of each cycle of operation all of the containers in the weighing line are advanced one station of operation so that the containers at the bulk weighing stations are advanced one station of operation to come to rest at the shaker station 22; the containers at the shaker stations are advanced to the drip weighing stations; and the filled containers are advanced from the drip weighing stations to the transfer stations 26, 28, 30, such filled containers entering the pocket of their respective transfer units 102, 104, 106. Thus, when the transfer units are withdrawn each cycle of operation, three filled containers of different groups are returned to the conveyer 32 to be advanced and subsequently regrouped and discharged from the machine.

The regrouping operation may be described by noting that at the beginning of each cycle of operation, when an empty container is moved from the pocket of its transfer unit onto the bulk loading station of its duplex weighing unit, a filled container at the drip station of its duplex unit is simultaneously moved into the pocket from which the empty container was removed. Subsequently, when the transfer units are retracted, the filled containers are transferred onto the conveyer belt 32. It will also be noted that the empty containers of a single group are transferred to their respective duplex weighing units during succeeding cycles of operation. Thus, if the filling and weighing of container number 3 is completed during one cycle, container number 2 will be completed during a succeeding cycle, and container number 1 will be completed during a third cycle of operation, and the filled containers will likewise be transferred to the conveyer 32 during succeeding cycles of operation in the order of their completion. When container number 3 of a group filled by the first weighing unit 10 is transferred to the conveyer, such as container C–3 in FIG. 7, it will pass out of the pocket of transfer unit 102 and come to rest against the rearwardly extended leg of the transfer unit 104. During a succeeding cycle of operation, filled container C–2 will be moved into the pocket of transfer unit 104, and when the latter is retracted the container C–2 will assume a position in front of C–3, and both C–2 and C–3 will then pass through the pocket of transfer unit 104 to come to rest against the rearwardly extended leg of transfer unit 106. During the following cycle, filled container C–1 will be moved into the pocket of transfer unit 106, and when the latter is retracted C–1 will assume a position in front of C–2 and C–3, and the entire group may then pass through the pocket of transfer unit 106 to be discharged from the machine in the same order in which they entered the machine. Thus, as shown in FIG. 7, the group of containers A–1, A–2 and A–3 which are about to be discharged from the machine during the illustrated cycle are shown in the first position with two filled containers A–2, A–3 at rest against the rearwardly extended leg of the transfer unit 106, and the remaining filled container A–1 is at rest on the drip weighing station of the last duplex weighing unit 14. During the start of the cycle the container A–1 is advanced from the drip station into the pocket of transfer unit 106. Subsequently, when the transfer unit is retracted, it will bring container A–1 into alignment with and preceding the containers A–2 and A–3 on the conveyer to form a group of three in the same order in which they entered and which are free to pass along the conveyer through the transfer unit pocket, as illustrated in FIG. 7, to be discharged from the machine. It is believed that FIG. 7 clearly indicates the sequential positions of the individual containers of the succeeding groups during a cycle of operation so as to enable the course of the containers during succeeding cycles to be followed to effect regrouping of the same. It will be observed that the filled containers at no time come into contiguous engagement with the empty containers to effect registration thereof, the distribution of the empty containers being independent of the regrouping of the filled containers. Thus, in operation the empty containers are spaced from the filled containers at all times during their movement on the conveyer 32 as clearly shown in FIG. 7. It will be noted that the empty containers engage the stops 108, 112 to control the movement thereof, while the filled containers are arranged to engage the rearwardly extended portions of the transfer units 102, 104, 106 to control the movement thereof. It will also be noted that the stops 108, 110, 112 are operated by individual adjustable cams. While the stops operate substantially simultaneously, adjustment is made for the relatively small difference in time required for the containers to arrive at their specific stops.

As illustrated in FIGS. 5 and 6, each container transfer station 24, 26, 28, 30 is provided with a resiliently mounted stop or friction bar 161 carried by a curved arm 163 pivotally mounted at 165 in a bracket 167 secured to a side rail of the conveyer 32. A horizontal extension 169 from the curved arm is provided with a spring 171 arranged to rock the stop bar in a clockwise direction, as limited by an adjustable stop screw 173. The resiliently mounted stop bars 161 serve to align the empty containers on their supporting platforms 175 with the carrier fingers 38 in the weighing line, and when the filled containers are moved by the carrier fingers onto the platforms and into the pockets formed in the transfer units in preparation to be withdrawn, the bars 161 serve to frictionally retain the containers in the pockets so as to prevent the containers from sliding forward when the carrier fingers 38 come to rest.

Figure 9:
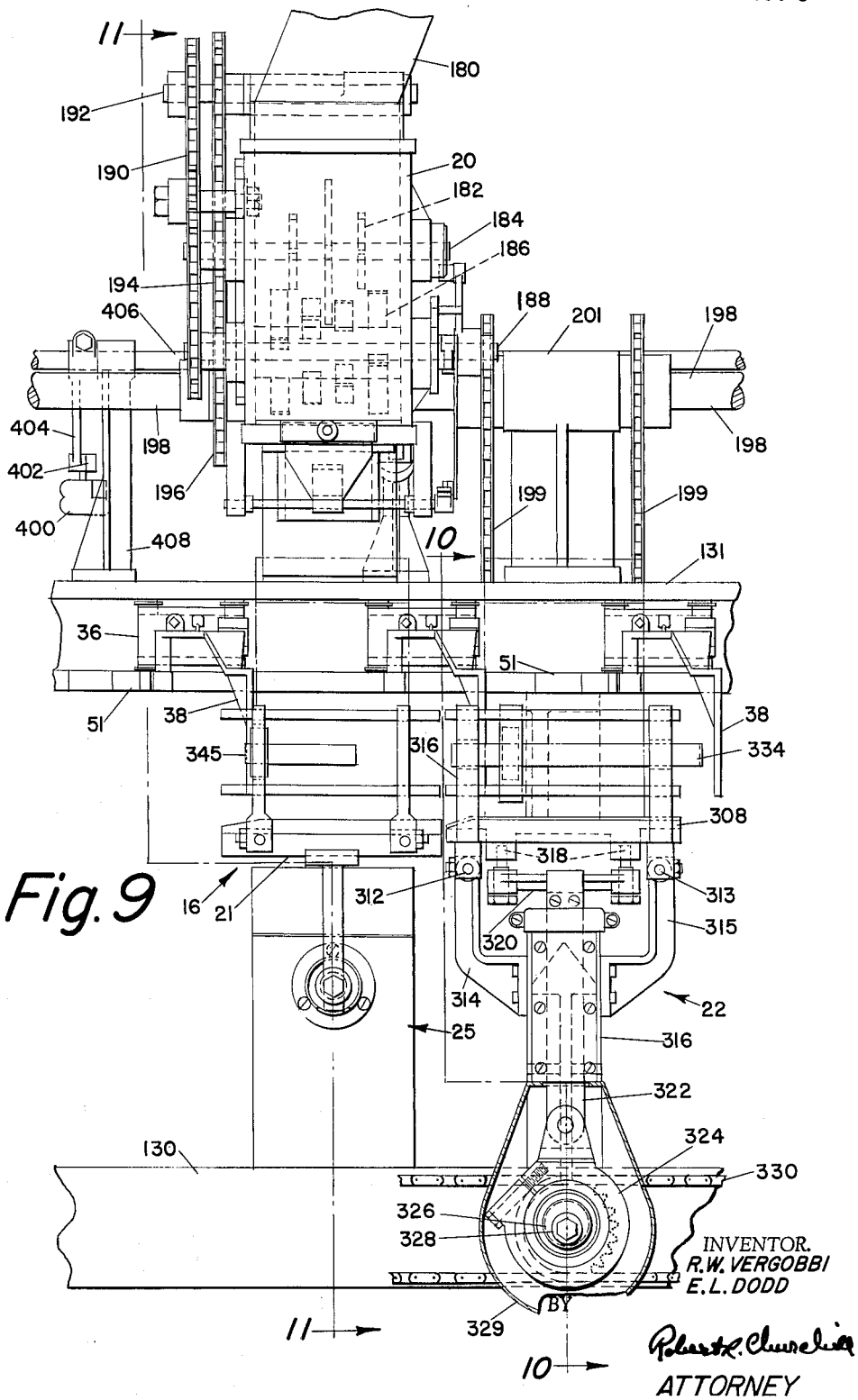
FIG. 9 is a front elevation of a material feeding and weighing station shown in FIG. 8 and also illustrating the container vibrating station.
Figure 11:
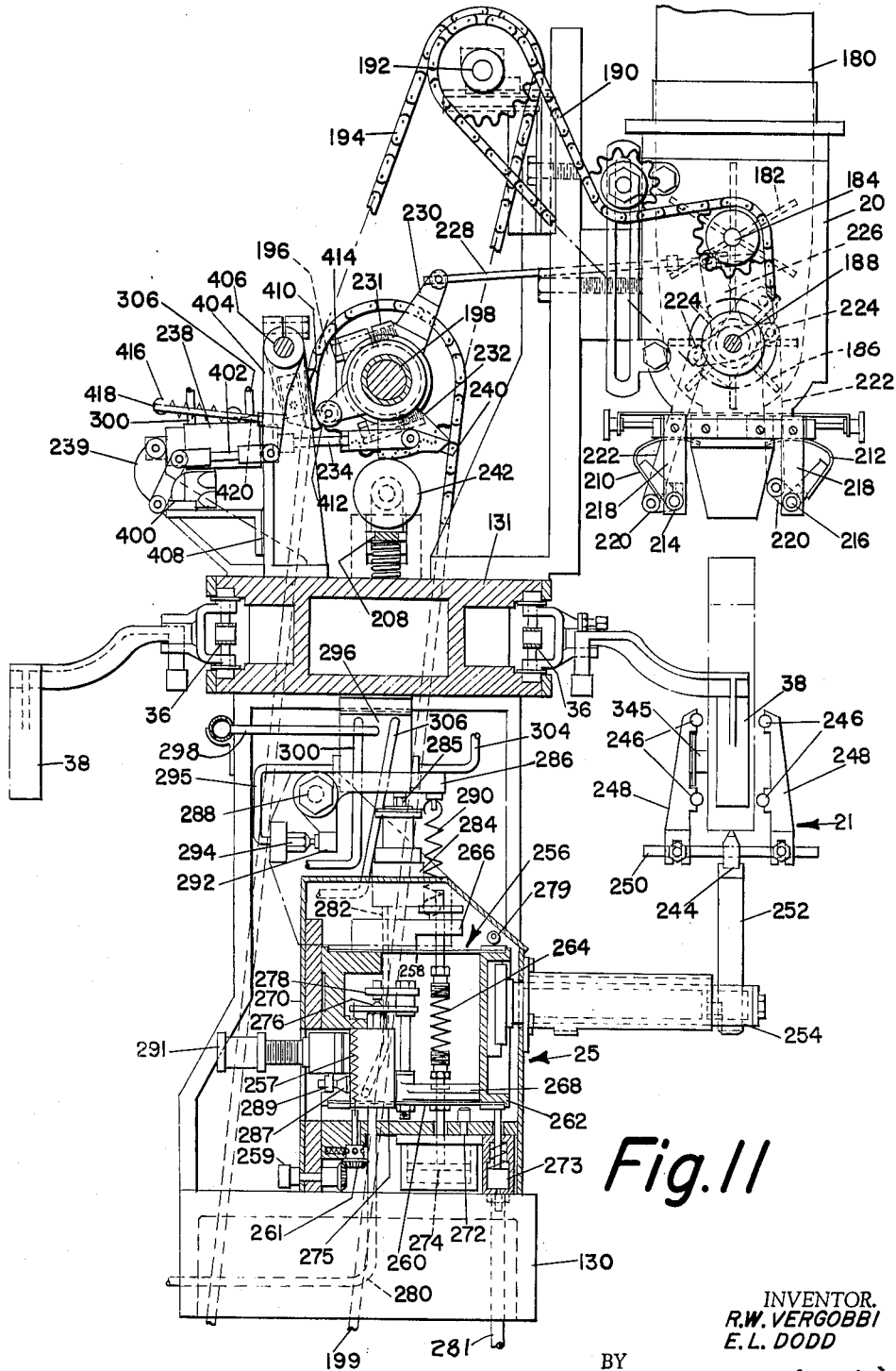
FIG. 11 is a cross sectional view in side elevation of a material feeding and weighing station and its associated control mechanism as seen from the line 11—11 of FIG. 9.

Referring now to FIGS. 8, 9 and 11, each weighing unit includes a material feeding hopper 20 to which material is supplied from any usual source through a supply hopper indicated at 180. Each feeding hopper is provided with an upper stirrer 182 mounted on a shaft 184 and a lower stirrer 186 mounted on a shaft 188. The stirrers are arranged to be driven during the feeding and weighing operation by a chain and sprocket drive 190 from an intermediate shaft 192 which in turn is connected by a chain 194 to a sprocket 196 fast on a shaft 198 common to all of the weighing units. The shaft 198 is preferably split in two at its central portion where the ends of the two shafts meet in a central bearing bracket 201, and each shaft 198 is driven by similar chain and sprocket drives 199 from the short shaft 64 forming a part of the main drive.

Figure 12:
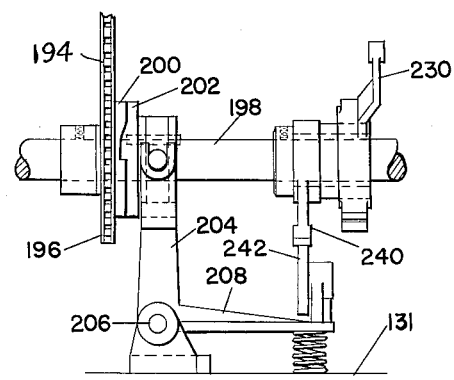
FIG. 12 is a detail view in front elevation of a portion of the control mechanism shown in FIG. 11.

The sprocket 196 is loose on the shaft 198 and has formed integrally therewith the driven member 200 of a toothed clutch. The driving member 202 of the clutch is slidably keyed to the shaft 198 and is arranged to cooperate with a bifurcated arm 204 of a bell crank pivotally mounted at 206 as shown in detail in FIG. 12. The second arm 208 of the bell crank carries a roller 242 and is spring pressed upwardly to effect engagement of the clutch and rotation of the stirrers during the feeding and weighing operation.

Each feeding hopper 20 is further provided with a pair of opposed feed cutoff shutters comprising curved plates 210, 212 pivotally mounted on shafts 214, 216, respectively, carried in extensions 218 depending from the hopper 20. Each shaft 214, 216 is provided with an arm 220 connected by links 222 to opposing arms 224 of a three-arm lever pivotally mounted on the shaft 188. The third arm 226 of the lever is connected by a link 228 to one arm 230 of a lever 231 pivotally mounted on the shaft 198. A second arm 232 is connected by a link 234 to the piston of a double acting air cylinder 238 forming a part of the pneumatic control system to be described. The outer end of the double acting cylinder 238 is pivotally mounted in a bracket 239 attached to the upper platen 131. The arm 232 is also provided with a cam surface 240 arranged to cooperate with the roller 242 carried by the spring pressed arm 208 of the clutch engaging lever. In operation the cam surface 240 permits engagement of the toothed clutch to drive the stirrers and feed material through the hopper 20 into the container supported below the feed hopper when the shutters 210, 212 are open as shown in FIG. 11. When the lever 231 is rocked in a clockwise direction the forward edges of the curved shutters meet to close the mouth of the hopper, and the cam surface 240 will rock the arm 208 downwardly to disengage the toothed clutch and discontinue driving of the stirrers 182, 186.

In operation all of the feed hoppers are opened simultaneously at the beginning of a cycle of operation, and each feed hopper is arranged to be individually closed to discontinue the feed in response to its individual weighing scale when the material deposited in its container reaches its predetermined weight. As shown in FIG. 11 the scale pan 21 on which the container is supported includes a bottom rail 244 and side rails 246. The side rails are supported in brackets 248 adjustably mounted on rods 250 carried by the bottom rail 244. The bottom rail is carried at the upper end of an upstanding bracket 252 adjustably supported in the outer end of a hollow shaft 254 secured to and extended from the free end of a cantilever spring beam weighing element indicated generally at 256 and which is mounted in a casing 270. The weighing element 256 consists essentially of a four-bar parallel linkage having upper and lower cantilever leaf springs 258, 260 of equal length rigidly connected at one end and connected by a rigid link 262 at its free end to which the scale pan is attached. A coil spring 264 having its upper end adjustably secured to a supporting member 266 has its lower end secured to an arm 268 projecting from and formed integrally with the rigid link 262 and serves to exert a counterforce upon the weighing element counteracting the weight of the container and the scale pan. The cantilever spring beam is limited in its movement by a lower stop 272 and an upper stop 274 mounted in the casing. A depending extension from the arm 268 carries a piston 279 operating in a dash pot mounted on the machine frame. A pneumatically operated scale lock, which includes a cylinder and piston, indicated at 273 is arranged to hold the weighing element against the upper stop during the initial impact of the load and is unlocked to perform the weighing operation. The scale lock 273 is arranged to be operated by a cam 277 fast on the main cam shaft 58, as shown in FIG. 3, and is arranged to open a valve which permits air to pass through a pipe 281, as shown in FIG. 11, at the proper time in the operating cycle.

The cantilever beam weighing element is arranged to cooperate with a pneumatically operated unit 275 which is attached to the casing 270 and which may comprise a pressure responsive amplification unit having a primary and a secondary air circuit, as fully illustrated and described in the T. P. Howard Patent No. 2,704,197, and which is adapted to permit rapid closing of the shutters and discontinuance of the feed upon minute deflection of the cantilever spring beam unit. As herein shown, the pneumatically operated unit 275 is provided with a jet member 276 arranged to cooperate with a valve member 278 carried by and movable with the weighing element. The construction of the pneumatically operated unit is such that a large pressure change occurs upon minute movement of the valve member toward the jet orifice when the weighing element is deflected through a correspondingly minute distance. Air may be supplied to the primary and secondary air circuits of the unit 275 from a regulated source through a supply pipe 280, and in the illustrated embodiment of the device the air from the secondary circuit passes through a pipe 282 to an air cylinder 284 forming a part of the control circuit for effecting discontinuance of the feed from the hopper 20. The piston 285 of the air cylinder 284 is normally maintained in an extended position by the air in the secondary circuit. The secondary circuit is provided with an air escape jet 287 which cooperates with a valve member 289 operatively connected to an adjustable air bellows unit 291 spring pressed inwardly to maintain the jet 287 closed whereby to maintain the pressure in the secondary circuit to normally maintain the piston 285 extended. In operation, when the pressure in the primary circuit is increased, the valve member 289 moves away from the jet to reduce the pressure in the secondary circuit to thus permit the piston 285 to be retracted. The cantilever spring beam unit 256 is also provided with a relatively weak spring 257 tending to pull the beam down in opposition to the spring 264 for the purpose of making a fine scale adjustment. The tension in the spring 257 may be adjusted by a hand knob 259 connected by bevel gears 261 to a spring stud to which one end of the spring 257 is connected. The other end of the spring is connected to an extension from the valve supporting rod carried by the arm 268.

The piston 285 cooperates with one arm 286 of a bell crank pivotally mounted at 288 and which is urged to rock in a clockwise direction by a spring 290 as shown in FIG. 11. The second arm 292 of the bell crank is arranged to cooperate with a bleed valve 294 connected by a pipe 295 to one side of a pilot valve 296. The pilot valve 296 is connected to a source of air under pressure from a pipe 298 and is of the type provided with a slide valve arranged to be shifted to one side when the pressure is reduced, as by the bleed valve 294, to open a port leading to a pipe 300 connected to one end of the air cylinder 238. In operation, when the load in the container reaches a predetermined weight, the piston in the cylinder 238 will be moved to close the shutters 210, 212 and discontinue the feeding operation. Thus, each weighing unit is individually tripped when a predetermined load is deposited in its container. In practice the feeding mechanism and the weighing units are adjusted so that under normal operating conditions all of the weighing units will be tripped within a predetermined time in a cycle of operation so that the cam shaft 58 will continue cycling to effect advancement of the containers one station of operation as described. Thereafter, a cam operated bleed valve 302 shown in FIG. 15, common to all of the weighing units and connected by pipes 304 to the other side of said pilot valve, will be actuated to reduce the pressure on the other side of all of the pilot valves 296 to effect shifting of each slide valve to open a port leading to a pipe 306 connected to the other end of the air cylinder 238. Thus, all of the shutters and feed hoppers are opened simultaneously to start the feeding operation.

Figure 10:
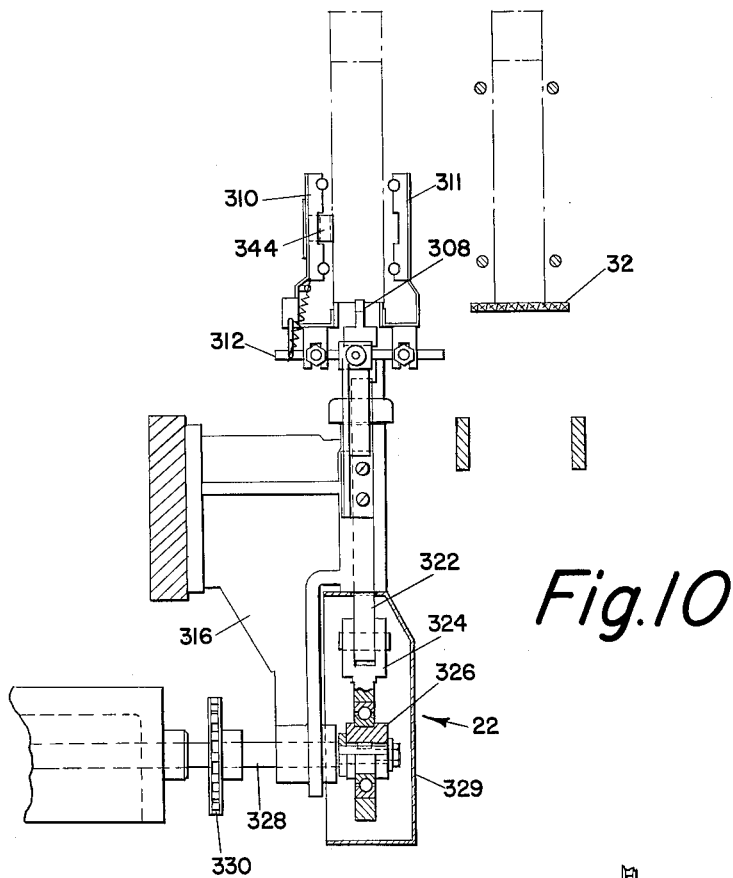
FIG. 10 is a cross sectional view of the container vibrating mechanism as taken on the line 10—10 of FIG. 9.

When the containers are advanced one station of operation at the start of a new cycle, the containers at the bulk weighing stations are moved onto their respective container vibrating or shaker stations 22 to settle the material deposited therein. As shown in FIGS. 9 and 10, each container vibrating station includes a vibratory platform 308 on which the container is supported between opposed side rails 310, 311, which latter are adjustably mounted on rods 312, 313 carried by brackets 314, 315, respectively, which are secured to a supporting bracket 316 attached to the machine frame. The vibratory platform 308 is adjustably mounted on spaced screws 318 carried by laterally extended arms 320 secured to the upper end of a slide bar 322 mounted to reciprocate in the supporting bracket 316. The slide bar 322 is connected at its lower end to an eccentric strap 324 which cooperates with an eccentric 326 fast on a shaft 328. The eccentric mechanism is enclosed in a casing 329 as shown. Each shaft 328 of the various vibrating stations is interconnected by chain and sprocket drives 330 and, as shown in FIGS. 1 and 3, the shafts 328 are arranged to be rotated by an electric motor 332 connected by a drive belt 334 to a pulley 336 fast on a shaft 338. The shaft 338 is connected by spur gears 340, 342 to the endmost shaft 328 as illustrated in FIG. 3. One of the side rails, 310, may be provided with a leaf spring 344 arranged to frictionally bear against the container to prevent lateral displacement thereof during the settling operation. Each scale pan 21 may be provided with a similar leaf spring 345 for preventing displacement of its container during the weighing operation.

From the description thus far it will be seen that each weighing unit of the multiunit gross weight weighing machine is arranged to perform its individual weighing operation in a predetermined time within a cycle of operation of the cam shaft 58, and during each cycle of operation the containers are first moved one station of operation along the weighing line whereupon all of the feed hoppers 20 are opened simultaneously to deposit the material into the containers. The scales are then unlocked to perform the weighing operation. As each unit completes its weighing operation its individual hopper is closed to cut off the feed of the material to its container. During normal operation all of the weighing units will have completed their weighing operations within a predetermined time in the cycle of operation of the cam shaft 58.

Figure 13:
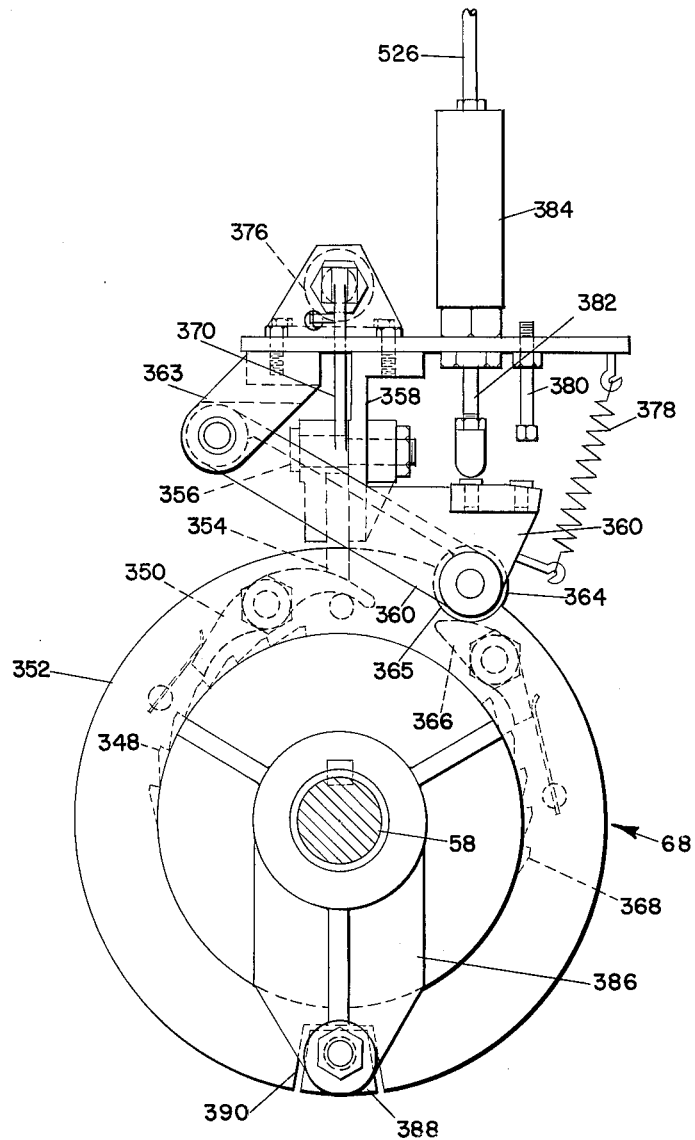
FIG. 13 is a front elevation of a one revolution clutch forming a part of the driving mechanism.
Figure 14:
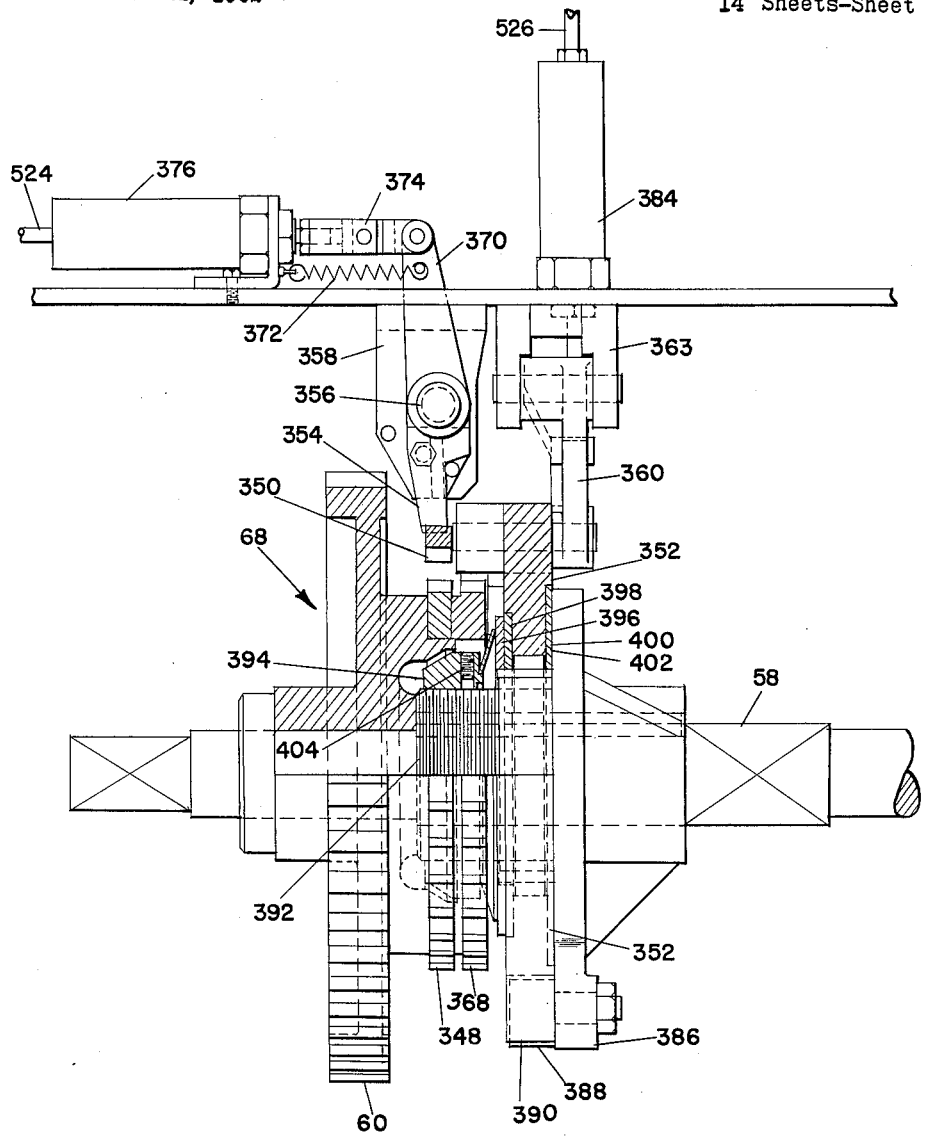
FIG. 14 is a side elevation of the same shown partly in cross section.

The above sequence of operations may be controlled by the one-revolution clutch 68 forming a part of the driving mechanism shown in FIG. 3 and which is shown in detail in FIGS. 13 and 14. The one-revolution clutch includes a ratchet 348 mounted to rotate with the driven gear 60, and a spring pressed pawl 350 cooperating with the ratchet is pivotally mounted in a pawl carrier disk 352 arranged to rotate with the cam shaft 58. A pawl stop 354 is pivotally mounted on a stud 356 supported in a bracket 358 and is arranged to be moved into the path of the tail of the pawl 350 to disengage the same from the ratchet, the pawl being free to engage the ratchet when the pawl stop is moved out of the path of the pawl. An arm 360 pivotally mounted at 362 in a bracket 363 is provided with a roller 364 for cooperation with a cutout 365 of the pawl carrier disk 352. A second pawl 366 carried by the disk 352 and a cooperating ratchet 368 may be provided to prevent reverse rotation of the cam shaft. As shown in FIG. 14, the pawl stop 354 is provided with an upwardly extended arm 370 and is urged to rotate in a counterclockwise direction to effect disengagement of the clutch by a spring 372 connected to the arm 370. The arm 370 is also connected by a link 374 to the piston of an air cylinder 376 forming a part of the pneumatic control mechanism to be described. In practice, as long as all of the scales make their weight within the predetermined time limit, the piston is extended from the cylinder 376 to retract the pawl stop and to permit the pawl 350 to remain in engagement with the ratchet 348 and to continue cycling of the machine. During this time the roller arm 360 is urged upwardly by a spring 378 to prevent engagement with the cutout 365, the arm being limited in its upward movement by a stop screw 380. As shown in FIG. 13, the piston 382 of an air cylinder 384 is arranged to cooperate with the roller arm 360 to push the same downwardly to engage the roller with the cutout against the resistance of the spring 378. In practice, when the pawl stop cylinder 376 is actuated by a reduction in air pressure to effect retraction of its piston, the pawl stop 354 will be moved into the path of the pawl 350 to disengage the clutch. Simultaneously therewith, the roller arm cylinder 384 is actuated by an increase in air pressure to advance its piston so as to present the roller 364 into the cutout 365 whereby to effect stopping of the cam shaft 58 in a zero position in readiness for the start of a new cycle of operation.

It will be appreciated that when the drive pawl 350 is initially engaged with the ratchet 348 a relatively sharp impact will be encountered and, as illustrated in FIGS. 13 and 14, provision is made for absorbing such initial impact to permit a gradual pickup of the load. This is accomplished by a friction drive assembly which includes a separate radially extended driving section or arm 386 keyed to the shaft 58 and provided with a drive block 388 received in a wide slot 390 formed in the pawl carrier disk 352. The radially extended section 386 is provided with a sleeve 392 extending through the carrier disk, the sleeve being threaded at its inner end to adjustably receive a dished spring mounting 394. The spring mounting 394 bears against an annular metal member 396 engageable with an annular friction element 398 carried by a recessed portion in one face of the pawl carrier disk. The opposite face of the pawl carrier disk is also provided with an annular recessed friction element 400 which bears against the face 402 of the radially extended section 386. Thus, the pawl carrier disk 352 is frictionally embraced by the driving section so that in operation, when the pawl 350 is released to engage the drive ratchet 348, the initial impact is taken up by the friction assembly through a relatively short arc, about five degrees, comprising the clearance of the drive block 388 in the slot 390 whereupon the block 388 will engage one side of the slot to effect positive driving of the pawl carrier disk. As illustrated in cross section in FIG. 14, the friction drive assembly may be adjusted on the threaded portion of the sleeve 392 and secured in its adjusted position by a set screw 404. Subsequently, when the pawl stop 354 is moved into the path of the pawl 350 to disengage the same from the ratchet, the inertia of the cam shaft will move the driving section 386 ahead slightly to present the block 388 against the opposite face of the slot 390 in a position to absorb the impact when the clutch is again engaged.

Figure 15:
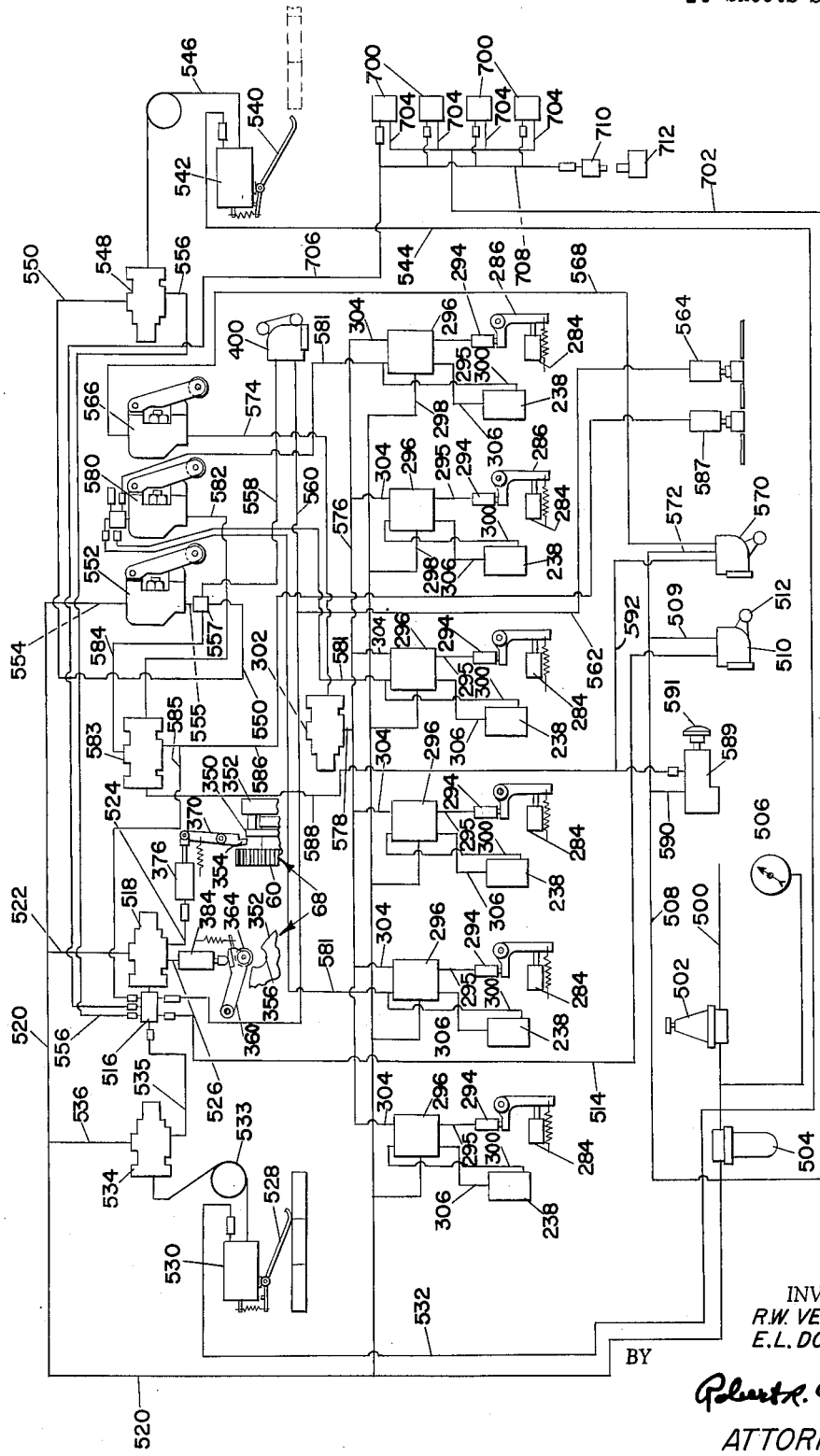
FIG. 15 is a diagrammatic view of the pneumatic control mechanism associated with the present machine.

In order to assure that all of the weighing units have completed their weighing operations within a predetermined cycle of rotation of the cam shaft 58, air actuated control means is provided which is rendered operative to maintain the pawl 350 and ratchet 348 of the one-reovlution clutch 68 in continuous engagement when the weighing units complete their weighing operations with the prescribed time cycle, said control means being operative to disengage the pawl 350 from its ratchet 348 to stop the shaft 58 in the event that one or more of the weighing units have failed to complete their weighing operations within such time. The air actuated control means includes an air valve 400, as shown in FIGS. 11 and 15, which is connected by a link 402 to an arm 404 fast on a rocker shaft 406 journaled in a bracket 408 attached to the platen 131. The shaft 406 is also provided with a plurality of scale trip detector arms 410 fast thereon which are arranged to cooperate with their respective weighing units. As herein shown, each arm 410 cooperates with a roller 412 carried by a third arm 414 of the lever 231 which is mounted to rock on the shaft 198. The arm 404 is urged to rock in a counterclockwise direction by a spring 416 connected at one end to an elongated stud 418 extended at right angles to the arm, and connected at its other end to a short stud 420 secured to the bracket 408. In operation, when the weighing units are performing their weighing operations, the parts are in the position shown in FIG. 11 wherein the rollers 412 engage the arms 410 to prevent rocking of the shaft 406 in a counterclockwise direction. Now, as each weighing unit completes its weighing operation, its roller 412 will be rocked out of the path of its detector arm 410, but as long as one weighing unit has not yet tripped, the arm 404 will be held from rocking by the roller 412 of such weighing unit to prevent actuation of the valve 400 and cause the pawl stop 354 to be actuated to bring the machine to rest at the end of the predetermined weighing cycle. However, if all of the weighing units do complete their weighing operations within the predetermined cycle, the valve 400 will be actuated to permit the one-revolution clutch 68 to remain engaged for a succeeding cycle of operation.

Referring now to FIGURE 15, the air actuated control means diagrammatically illustrated therein may be similar to the pneumatic control mechanism shown in the United States Patent to E. L. Dodd, No. 2,923,483, issued April 12, 1960. As herein shown, the air actuated control circuit includes a main air supply pipe 500 which may be connected to a source of compressed air and which passes through an air pressure regulator 502 and a lubricator 504. An air gauge 506 is also provided in the main line as illustrated. A branch 508 of the main air line is connected by a line 509 to the inlet of a manually operated control valve 510 having an operating handle 512. The outlet line 514 is connected to the inlet of a manifold ball check valve unit 516 connected to a master pilot valve 518. The master pilot valve 518 is connected by a branch line 520 from the main air supply to an inlet 522. One outlet from the pilot valve 518 is connected by a line 524 to the air cylinder 376 which controls the pawl stop 354. A second outlet is connected by a line 526 to the air cylinder 384 which controls the roller arm 360. In operation, when the handle 512 of the control valve 510 is in one position of operation, the air to the pilot valve 518 through line 514 is cut off. As a result, the air to cylinder 384 is cut off to permit the roller 364 to be rocked upwardly and, simultaneously therewith, the air from the line 522 is permitted to pass through line 524 to the cylinder 376 to maintain the piston extended and to maintain the pawl stop out of the path of the pawl and permit driving engagement of the one-revolution clutch 68. Conversely, when the handle 512 is moved to a second position, air may pass through line 514 to the master pilot valve to shift the ports therein so that air is permitted to extend the piston in cylinder 384, and air is cut off from the cylinder 376. As a result, the pawl stop 354 will be rocked into the path of the pawl to disengage the clutch 68, and the roller 364 will engage in the notch 356 to bring the machine to rest.

As also indicated diagrammatically in FIGURE 15, provision is made at the intake end of the machine for detecting depletion of the supply of containers and for stopping the machine when such depletion is detected. A spring rocked feeler arm 528 engaging the sides of the containers on the conveyer 32 is arranged to cooperate with a container safety valve 530 which is supplied with air through an inlet line 532. An outlet line 533 leads to a container safety pilot valve 534 which is supplied with air under pressure by a branch line 536. The outlet 535 from the pilot valve 534 leads to the manifold ball check valve 516 connected to the master pilot valve 518. In operation, when the feeler arm 528 rests against the sides of the incoming containers, pressure is built up within the valve 530, and air is permitted to flow to the pilot valve 534. As a result the pilot valve 534 is actuated to cut off the air to the manifold ball check valve and master pilot valve 518 so that the latter will remain in a position to maintain the pawl stop 354 retracted to permit the machine to continue in operation. However, in the event that the feeler arm 528 is rocked inwardly, indicating depletion of the containers at the intake end of the machine, the air in the container safety valve 530 will be released, thus preventing air from passing through line 533 to the pilot vale 534. As a result air is permitted to pass through the pilot valve 534 and line 535 to the master pilot valve 518 to shift the latter to a position to cut off the air through line 524 to the cylinder 376. Thus, the pressure is reduced in the cylinder 376 to permit the pawl stop 354 to be rocked in a counterclockwise direction into the path of the pawl to disengage the same from its ratchet and discontinue operation of the machine. Simultaneously therewith, the pressure is increased in cylinder 384 to rock the roller 364 into the notch 356.

A similar container safety device is provided at the discharge end of the machine and includes a spring urged feeler arm 540 and a safety valve 542. In practice the containers at the discharge end are carried on the conveyer 32 to be delivered to a container closing machine or other machine, and in the event that such container closing machine is stopped or cannot handle the filled containers as fast as they are discharged by the weighing machine, a jam of containers will occur on the conveyer between the weighing machine and the container closing machine. The container safety device is arranged to avoid such a jam by detecting the presence of a group of containers at the discharge end at a predetermined time near the end of a cycle, which group would normally have passed beyond the detecting point at such time. As shown in FIGURE 15, the safety valve 542 is supplied with air by a branch line 544 from the main line 500, and the safety valve is provided with an outlet line 546 leading to a pilot valve 548. The pilot valve 548 is supplied with air through a line 550 from a cam operated timing valve 552, which latter is supplied with air through a branch line 554 from the supply line 520. The timing valve is provided with an outlet 555 and manifold block 557 to which the line 550 is connected. The timing valve 552 is normally closed and is arranged to be opened by a cam 553, see FIGURE 3, a fraction of a second before the end of a cycle of operation. The safety valve 548 is further provided with an outlet line 556 leading to the manifold ball check valve 516 and the master pilot valve 518. In operation, when the feeler arm 540 is rocked or spring urged inwardly indicating that the group discharged from the machine has passed beyond the detecting point in a normal manner, air is permitted to bleed from the safety valve 542. As a result the pilot valve 548 will remain in a position to prevent air from passing therethrough when the master timing valve 552 is opened near the end of the cycle of operation, and as a result no air will pass through line 556 to the master pilot valve so that the pawl stop 354 will remain in its withdrawn position to permit the machine to continue in operation. On the other hand, in the event that the feeler arm 540 rests against the containers at such time, air pressure is permitted to build up in the safety valve 542 to shift the pilot valve 548 to a position to permit air to pass from the timing valve through lines 550 and 556 to the master pilot valve 518 which will shift the master pilot valve to a position to cut off the air to the cylinder 376 and permit rocking of the pawl stop into the path of the pawl to discontinue operation of the machine. It will be understood that the safety valves 530 at the intake end of the machine and 542 at the discharge end of the machine will not be actuated by the containers in the manner described until a predetermined time has passed in order to build up a pressure within such safety valves. In other words a temporary gap in the line, of short duration, at the intake end of the machine will not interrupt the operation of the machine, and a short delay at the discharge end of the machine will likewise not interrupt operation of the machine.

The cam operated master safety or timing valve 552 shown in FIGURE 15 is also arranged to cooperate with the slow scale detecting valve 400 for the purpose of assuring that all of the scales have made their weights within the predetermined time cycle and for discontinuing operation of the machine in the event that one or more of the scales have not tripped within such time. The slow scale detecting valve 400 is provided with an inlet 558 leading from the master timing valve 552 and an outlet 560 leading to the master pilot valve 518. In operation, if all of the scales have made their weights within the predetermined time limit, passage of air through the detecting valve 400 is cut off so that when the timing valve 552 is opened near the end of the cycle, air cannot pass through lines 558, 560 to operate the master pilot valve, and the machine will continue in operation. However, in the event that one or more of the scales have failed to trip within the predetermined time limit, the slow scale detecting valve 400 will remain open so that when the timing valve 552 is opened near the end of the cycle, air may pass through lines 558, 560 to actuate the master pilot valve 518 to discontinue operation of the machine. At such time the operator may adjust the feed and the weighing scale if necessary to cause the weighing unit to complete its weighing operation within the prescribed time. A line 562 connected to the line 560 is arranged to actuate a signal 564 to indicate to the operator that one or more of the scales has failed to trip within the predetermined time limit.

Provision is also made for resetting the feed hopper clutches 200, 202 and shutters 210, 212 to start the feed of the material from all of the feed hoppers simultaneously at the start of the weighing operation. This is accomplished by a cam operated reset valve 566 which is supplied with air by a line 568 leading from a manual feed control valve 570 which in turn is supplied with air through a line 572 connected to the supply line 508. The reset valve 566 is operated by a cam 567 fast on the main cam shaft 58 as shown in FIGURE 3. The outlet line 574 of the reset valve leads to the bleed valve 302 common to all of the weighing units. As previously described, all of the pilot valves 296, which are individually actuated as their weighing scales complete their weights, are connected by lines 304 to a line 576 which in turn is connected by a line 578 to the bleed valve 302. The function of the bleed valve 302 is to bleed all of the pilot valves 296 simultaneously to thereby reset the latter to permit passage of air to cylinders 238 which operate to engage the feed hopper clutches and to open the shutters. The bleed valve 302 is normally closed and is opened by operation of the reset valve 566 at a time in the cycle immediately after the containers have been moved one station of operation and have come to rest on the weighing scales. At this time all of the pilot valves 296 are bled simultaneously to start the material feeding hoppers and to open the shutters. The manual control valve 570 is provided for the purpose of cutting off entirely the passage of air to the reset valve 566 to prevent operation of the material feeding mechanism while permitting the containers to pass through the machine without being filled or weighed. This expedient is of advantage at times when it is desired to clear the machine of containers at the end of a day's run, or to feed containers into position in the machine at the start of a day's run.

Provision is also made for detecting a malfunction in the machine which may cause a drip weighing scale to trip prematurely, such as when an overload is deposited in a container at a preceding bulk weighing station. This is accomplished by a cam operated fast scale valve 580 which is arranged to be opened by a cam 579, see FIGURE 3, a relatively short time after the feed hoppers are opened and the weighing scales are unlocked. The fast scale valve 580 is connected to the three drip scale pilot valves 296 by air lines 581. When a drip scale trips, the pilot valve 296 is actuated to cause air to flow through line 300 to the cylinder 238 to close the shutters and disengage the material feeding clutches. Simultaneously therewith, air may also flow through line 581 to the cam operated fast scale valve 580. If this occurs prematurely during the relatively short time the fast scale valve 580 is open at the start of the weighing operation, the air will pass through a line 582 to a pilot valve 583 to present the same in a position such as to permit air to subsequently pass from the master timing valve 552, through line 584 and thence through outlet line 585 to the master pilot valve 518 to discontinue operation of the machine. This occurs upon operation of the timing valve 552 a fraction of a second prior to the end of the cycle and, simultaneously therewith, air is passed through line 586 to a signal 587 to indicate to the operator that one of the scales has tripped prematurely so that he can make the proper adjustments to correct the malfunction. An air line 588 is connected between the pilot valve 583, and a manually operated reset valve 589 which is provided for the purpose of resetting the pilot valve 583. The reset valve 589 is connected by a line 590 to the air supply line 508 and is provided with an operating button 591 which may be pressed to permit air to flow through line 588 to reset the pilot valve 583 after the malfunction has been cured. A branch line 592 leads from the pilot reset line 588 to the manually operated feed control valve 570 which, when set to permit the machine to cycle without operating the material feed, also permits air to flow through the line 588 whereby to maintain the pilot valve 583 inoperative to stop the machine during such time.

Also diagrammatically indicated in FIG. 15, are a plurality of pneumatically operated transfer pusher safeties indicated at 700 comprising normally closed valves and which are supplied with air by a branch line 702 and inlet lines 704. In practice the safeties 700 are arranged to cooperate with their individual pusher mechanisms in a manner such that in the event of a jam of a carton a resiliently connected portion (not shown) of the pusher will yield and separate from the positively moved portion thereof. When this occurs the particular valve 700 will be opened to permit air to pass through line 706 to the master pilot valve 518 to discontinue operation of the machine. Simultaneously therewith, air will pass through line 708 to a cylinder 710 to extend its piston and operate a switch 712 adapted to break the circuit to the main driving motor.

It will be evident that the pneumatic control mechanism eliminates any hazards which might otherwise be encountered where the atmosphere may be charged with explosive dust from the material being packaged. Such explosive dust might comprise a hazard when electrical controls embodying arcing switch controls are employed. It will also be seen that the cylinder 376 depends on air under pressure to maintain the pawl stop 354 out of engagement with the pawl 350, and a reduction in pressure will cause the pawl stop to be spring urged to disengage the pawl from the driving ratchet to bring the machine to rest. Hence, any failure in the air supply will likewise cause the pawl stop to be spring urged to discontinue operation of the machine.

From the above description it will be seen that the present structure of a unitary gross weight weighing machine provides a plurality of multiple weighing units in a line whereby to provide a compact structure occupying less floor space than formerly required for independently operated duplex units, and wherein each duplex unit is arranged to handle one of a group of containers permitted to enter the machine each cycle of operation. It will also be seen that the machine operating in successive cycles is provided with control means common to all of the multiple weighing units. It will be further observed that the present invention provides container handling mechanism adapted to distribute groups of containers permitted to enter the machine each cycle of operation in a manner such that successive empty containers of a group are delivered to successive multiple weighing units during successive cycles of operation, and that after the weighing operations are completed the present container handling mechanism is also adapted to regroup the filled and weighed containers in the same order in which they entered the machine prior to being discharged therefrom.

In a modified form of multiple unit weighing machine, provision is made for weighing extra large loads into large containers. In order to provide such extra large loads in the allotted time in a predetermined cycle of operation of the machine, each multiple weighing unit is provided with three weighing stations including two bulk weighing stations, each supplying a part of the bulk load during successive cycles and having a shaker station therebetween, and a single drip weighing station with a shaker station between the second bulk load station and the drip station. As illustrated diagrammatically in FIG. 16, there are two multiple weighing units shown, and the containers are arranged to enter the machine in groups of two containers, the second container of the group being delivered to the first multiple unit designated by the letter X, and the first container of the group being delivered to the second multiple unit designated by the letter Y. Each group of filled containers is also regrouped on the conveyer to be discharged from the machine in the same order in which they entered. Thus, there is a total of six weighing scales or stations in the two multiple weighing units which corresponds to the number of weighing stations in the form of the invention above described wherein there are three multiple weighing units, each having two weighing stations.

Figure 16:
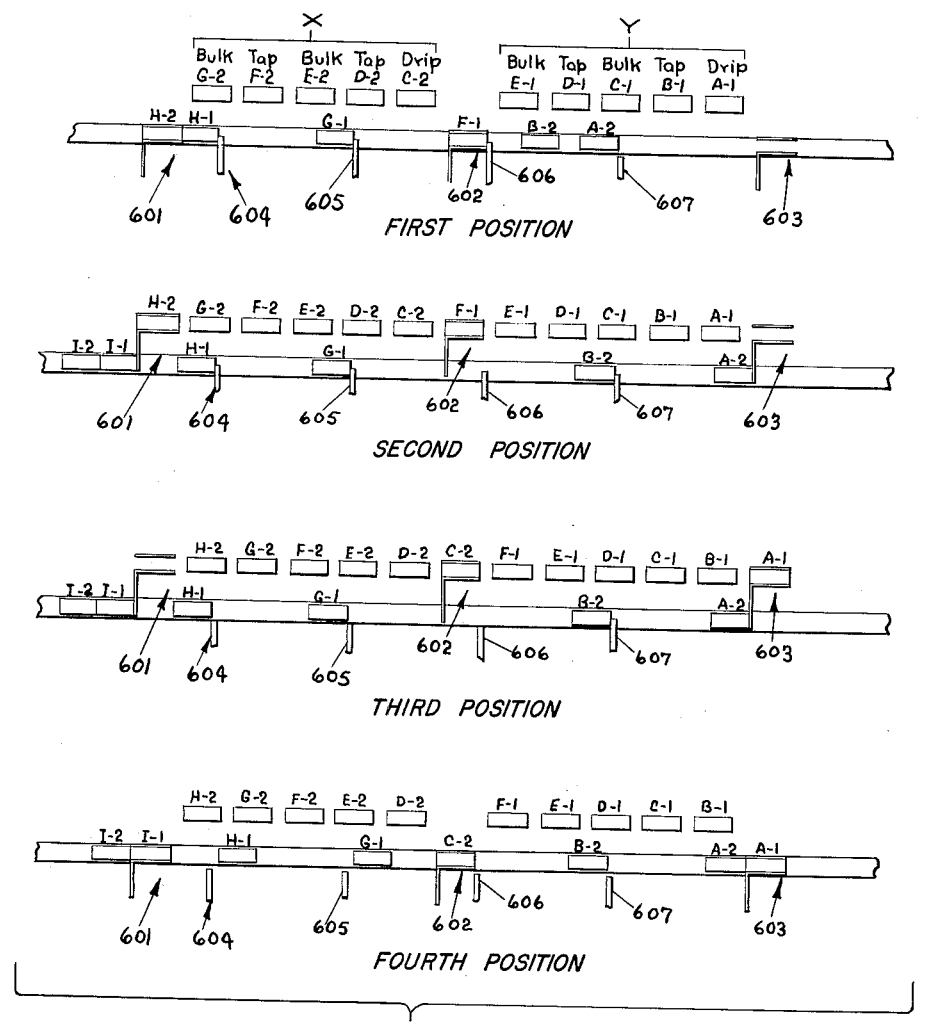
FIG. 16 is a diagrammatic view similar to FIG. 7 illustrating the sequence of movement of the containers during one cycle of operation in a modified form of the machine wherein two multiple weighing units are provided, each unit having two bulk weighing stations and a drip weighing station.

The four different positions of the containers shown in FIG. 16 illustrate one cycle of operation of the machine. In order to accommodate the groups of two packages for distribution to two multiple weighing units, there are provided three transfer stations indicated at 601, 602 and 603, and four stopping and releasing mechanisms indicated at 604, 605, 606 and 607. In the first position shown in FIG. 16 a group of containers H1, H2 have been admitted into the machine on the continuously moving conveyer and are retained by the stop 604, the container H2 being supported in the pocket of transfer member 601. In the second position the container H2 has been transferred into the weighing line while H1 is still held. In the third position H2 has been moved one station of operation onto the first bulk loading and weighing station of the multiple unit X while the container H1 is released to be subsequently engaged by the stop 605. In the fourth position the transfer member 601 is retracted to admit a succeeding group of two containers I1, I2. It is believed that by noting the positions of the preceding containers G1, G2, F1, F2, etc., the sequence of the containers through the machine will be readily apparent. Thus, while G1 is being held back by the second stop 605, G2 is at the first bulk weighing station of the first multiple unit, and while empty container F1 is positioned in the pocket of transfer member 602 and retained therein by stop 606, F2 is at the shaker station. It will be noted that empty container F1 is transferred into the weighing line six stations or six cycles after the container F2. When empty container F1 is moved onto the first bulk station of multiple unit Y, a filled container C2 is moved into the pocket of transfer member 602 to be returned to the moving conveyer while C1 is at the second shaker station of multiple unit Y. A previously filled container B2 is held by stop 607 while B1 is positioned at the drip weighing station of multiple unit Y; and previously filled container A2 is held by the rearwardly extended leg of transfer unit 603 while filler container A1 enters the pocket of transfer unit 603 to be subsequently withdrawn to a position in front of A2 on the conveyer, as shown in the fourth position, to be discharged from the machine in the same order in which they entered the machine.

It will be understood that the modified form of the invention diagrammatically illustrated in FIG. 16 may embody material feeding mechanisms, weighing mechanisms and control means similar to those disclosed in the above-described embodiment of the invention illustrated in FIGS. 1–15.

It will be appreciated that the present container handling mechanism may also be used with advantage in machines other than weighing machines, such as in a machine which is provided with spaced operating stations arranged in a line for performing various operations on articles which are intermittently moved from one station to another, and wherein such articles may be supplied to the various stations and removed therefrom in the manner herein described.

The illustrated shuttling mechanism, as herein described, is preferably arranged to handle and distribute successive groups of containers by transferring the endmost container of a group from the conveyer to a first station, the next preceding container to a second station, and so on, and the filled containers are thereafter returned to the conveyer in a manner such as to assume the same order or sequence as that in which they entered the shuttling mechanism. However, it will be understood that such order or sequence may be varied and that the present invention contemplates shuttling mechanism arranged to handle and distribute successive groups of containers wherein the first container of a group or an intermediate container of the group may be transferred to the first station and the remaining containers of the group transferred to succeeding stations in any preferred sequence. It will also be understood that the filled containers do not necessarily have to be returned to the conveyer in the same order in which they entered the machine but may be returned in a different sequence in accordance with the present invention.

While the preferred embodiment of the invention has been herein illustrated and described, it will be understood that the invention may be embodied in other forms within the scope of the following claims.

Having thus described the invention, what is claimed is:

1. In a gross weight weighing machine operating in successive cycles and having a plurality of spaced multiple weighing units arranged in a line, each multiple weighing unit having at least two weighing stations for providing a bulk load and a drip load into successive single containers delivered thereto, means for intermittently moving the single containers in the weighing line one station each cycle of operation, a continuously moving container supply and discharge conveyer, and container and handling means comprising means for moving containers laterally into and out of said weighing line including a plurality of cyclically operated transfer means, a plurality of cyclically operated stop means, and means for operating said transfer means and said stop means to admit containers onto the conveyer in a contiguous group each cycle of operation corresponding in number to the number of multiple weighing units and to distribute and transfer the individual single empty containers of successive groups from the conveyer into the weighing line during successive cycles to be filled and weighed by their respective multiple weighing units, said transfer means and said stop means also operating to transfer successive individual single filled and weighed containers from the weighing line back onto said conveyer during successive cycles and to regroup said individual single filled containers in contiguous relationship on the conveyer to be discharged from the machine.

2. The combination as defined in claim 1 wherein the containers are regrouped and discharged from the machine in the same order in which they were admitted into the machine.

3. The combination as defined in claim 1 wherein there are three multiple weighing units, each unit having a bulk weighing station and a drip weighing station.

4. The combination as defined in claim 1 wherein there are two multiple weighing units, each unit having two bulk weighing stations and one drip weighing station.

5. The combination as defined in claim 1 wherein a vibratory material settling station is provided intermediate adjacent weighing stations.

6. The combination as defined in claim 1 wherein a container transfer station is provided preceding the first multiple weighing unit; intermediate successive multiple weighing units; and following the last multiple weighing unit in the line.

7. The combination as defined in claim 1 wherein the operating means includes a cam for operating all of the transfer means simultaneously and an individual cam for each of said stop means.

8. The combination as defined in claim 1 wherein each of said transfer means is provided with a pocket through which the containers may pass, said stops cooperating with successive groups of containers to position the endmost of a group of empty containers within a pocket to be transferred into the weighing line during successive cycles, said pockets permitting the intermittent moving means to move an empty container in the weighing line from the pocket onto a weighing station and to simultaneously move a filled container from a weighing station into the pocket to be withdrawn from the weighing line.

9. The combination as defined in claim 8 wherein each transfer unit is provided with a portion extending transversely of the conveyer and wherein a filled container withdrawn from the weighing line and returned to the continuously moving conveyer passes through the pocket and is stopped in its travel by the transversely extended portion of a succeeding transfer unit, said stopped container being regrouped with a filled container withdrawn by said succeeding transfer unit to pass through the pocket of the latter together.

10. A gross weight weighing machine operating in cycles comprising a plurality of spaced multiple weighing units arranged in a line, each multiple weighing unit having a plurality of weighing stations operative upon a single one of a group of contiguous containers entering the machine each cycle of operation, each multiple weighing unit having a productive capacity of a predetermined number of containers per cycle, drive means and control means common to all of said multiple weighing units, container supply and discharge means, and means for handling the individual single containers of successive groups to distribute the same from said supply to their respective spaced multiple weighing units during successive cycles to be filled and weighed and to redistribute the individual filled and weighed containers of the group from their weighing units back to said discharge means during successive cycles and to discharge the same as a group in contiguous relation whereby to multiply the predetermined productive capacity per cycle of one multiple weighing unit by the number of multiple weighing units provided.

11. The combination as defined in claim 10 wherein the drive means includes a one-revolution clutch, and the control means includes a pneumatic circuit, each weighing station including material feeding means and a weighing scale, and means in said pneumatic control circuit actuated to permit continuous cycling of said one-revolution clutch when all of the weighing scales complete their weights within a predetermined time prior to the end of a cycle.

12. The combination as defined in claim 11 wherein the pneumatic control circuit is actuated to disengage the one-revolution clutch in the event that one or more of the scales fail to make their weights within said predetermined time.

13. The combination as defined in claim 11 wherein the pneumatic control circuit includes a cam operated valve arranged to reset all of the material feeding means simultaneously to initiate all of the weighing operations at once.

14. The combination as defined in claim 13 wherein the pneumatic control circuit includes a manually operated valve arranged to cut off the air to said cam operated resetting valve whereby to render the valve inoperative to reset the feeding means and to thus permit cycling of the machine to operate the container handling means while permitting the material feeding and weighing means to remain idle.

15. The combination as defined in claim 14 wherein the pneumatic control circuit includes means for detecting premature tripping of a weighing scale, said detecting means including a second cam operated valve, and a pilot valve responsive to said detecting means for effecting disengagement of said one-revolution clutch when a scale trips prematurely.

16. The combination as defined in claim 15 wherein the manually operated valve for rendering the resetting valve inoperative also renders inoperative the premature weight pilot valve to effect disengagement of said one-revolution clutch.

17. The combination as defined in claim 11 wherein each weighing scale comprises a cantilever spring beam weighing element, and pneumatically operated means forming a part of said control means actuated by deflection of the cantilever spring beam to effect discontinuance of the material feeding means when the scale has made its weight.

18. The combination as defined in claim 11 wherein the drive means includes a cam shaft and the one-revolution clutch mounted on said cam shaft includes a driving member comprising a continuously rotated ratchet free on said cam shaft, a driven member comprising a pawl carrying disk having a spring pressed pawl for cooperation with said ratchet, a drive arm keyed to said cam shaft and frictionally connected to said disk, and a driving connection between said arm and said disk permitting relative movement of the disk and the arm through said friction connection upon initial engagement of the clutch whereby to absorb the initial impact and to permit gradual pickup of the load, and to thereafter effect positive driving engagement between the drive arm and the pawl carrying disk.

19. A gross weight weighing machine operating in successive cycles comprising a plurality of spaced multiple weighing units arranged in a line, each multiple weighing unit having a plurality of material feeding and weighing stations adapted to fill and weigh selected single ones of a group of containers permitted to enter the machine each cycle of operation, drive means and control means common to all of said multiple weighing units, means for intermittently advancing the containers in the weighing line singly one station each cycle of operation, a continuously moving container supply and discharge conveyer, and container handling means for transferring the individual single ones of successive groups of containers from the supply conveyer into the weighing line during successive cycles to be filled and weighed by their respective multiple weighing units and for withdrawing the filled and weighed containers from their respective units in the weighing line back to the conveyer during successive cycles in a manner such as to regroup the same on the conveyer in the same order in which they were received.

20. A weighing machine comprising spaced multiple filling and weighing units operative in successive cycles, each unit having a plurality of weighing stations operative upon a single one of a group of containers entering the machine each cycle of operation, container supply and discharge means, means for distributing individual single containers of successive groups of containers to their respective multiple filling and weighing units during successive cycles to be filled and weighed and for redistributing and discharging the individual filled and weighed containers of the group singly from their respective weighing units to the discharge means during successive cycles.

21. A weighing machine comprising a plurality of spaced multiple weighing units, each weighing unit having a plurality of material feeding and weighing stations adapted to fill and weigh selected single ones of a group of containers permitted to enter the machine, means for advancing the containers singly to said feeding and weighing stations, a supply and discharge conveyer, and transfer means for transferring the individual single containers of successive groups of containers from the supply conveyer into position to be filled and weighed by their respective multiple weighing units during successive cycles and for transferring singly the filled and weighed containers from their respective weighing units to the supply and discharge conveyer during successive cycles.

References Cited by the Examiner

UNITED STATES PATENTS

| | | | |
|---|---|---|---|
| 548,840 | 10/1895 | Richards | 177—106 |
| 607,472 | 7/1898 | Richards | 177—53 |
| 1,631,117 | 6/1927 | Bent | 177—52 |
| 1,739,061 | 12/1929 | Cleaves | 177—53 |
| 2,116,895 | 5/1938 | Howard | 177—52 |
| 2,319,908 | 5/1943 | Walter | 177—57 |
| 2,628,055 | 2/1953 | Knobel et al. | 177—3 |
| 2,932,483 | 4/1960 | Dodd | 177—45 |
| 2,935,172 | 5/1960 | Todoroff | 198—19 |
| 3,024,816 | 3/1962 | Axlid | 141—83 |
| 3,062,353 | 11/1962 | Opperthauser | 198—19 |
| 3,064,697 | 11/1962 | Malone | 141—83 |
| 3,073,398 | 1/1963 | Blodgett | 177—53 |

FOREIGN PATENTS

| | | |
|---|---|---|
| 309,480 | 9/1929 | Great Britain. |
| 442,482 | 2/1936 | Great Britain. |
| 916,818 | 1/1963 | Great Britain. |

LEO SMILOW, *Primary Examiner.*

M. TEMIN, *Examiner.*

UNITED STATES PATENT OFFICE
CERTIFICATE OF CORRECTION

Patent No. 3,225,847                           December 28, 1965

Robert W. Vergobbi et al.

It is hereby certified that error appears in the above numbered patent requiring correction and that the said Letters Patent should read as corrected below.

Column 1, line 23, after "embodying" insert -- novel --; column 2, line 68, for "are" read -- were --; column 4, line 19, after "finger" insert -- during --; line 42, for "respectively in," read -- respectively, in --; column 5, line 67, after "cycle" insert a comma; column 8, line 59, after "FIG. 11" insert a comma; column 13, line 25, for "vale" read -- valve --; column 15, line 28, for "present" read -- preset --; column 17, line 69, strike out "and", third occurrence; column 18, line 11, for "relationship" read -- relation --.

Signed and sealed this 10th day of January 1967.

(SEAL)

Attest:

ERNEST W. SWIDER
Attesting Officer

EDWARD J. BRENNER
Commissioner of Patents